(12) United States Patent
Cho et al.

(10) Patent No.: US 12,341,353 B2
(45) Date of Patent: Jun. 24, 2025

(54) WIRELESS CHARGING POWER SUPPLY SYSTEM AND PICK-UP SYSTEM DURING RUNNING OF ELECTRIC VEHICLES AND INDUSTRIAL EQUIPMENT

(71) Applicant: WiPowerOne Inc., Daejeon (KR)

(72) Inventors: Dong-Ho Cho, Seoul (KR); Bo-Yune Song, Daejeon (KR); Kyo-Il Lee, Sejong-si (KR); Seong-Joo Kang, Daejeon (KR); Ye-Chan Jeong, Daejeon (KR); Dong-Kwan Seo, Daejeon (KR)

(73) Assignee: WIPOWERONE INC., Daejeon (KR)

( * ) Notice: Subject to any disclaimer, the term of this patent is extended or adjusted under 35 U.S.C. 154(b) by 621 days.

(21) Appl. No.: 17/391,281

(22) Filed: Aug. 2, 2021

(65) Prior Publication Data
US 2022/0021245 A1     Jan. 20, 2022

Related U.S. Application Data

(63) Continuation of application No. PCT/KR2020/001549, filed on Jan. 31, 2020.

(30) Foreign Application Priority Data

Feb. 1, 2019   (KR) .......................... 10-2019-0013372
Oct. 31, 2019  (KR) .......................... 10-2019-0137602
Nov. 20, 2019  (KR) .......................... 10-2019-0149875

(51) Int. Cl.
*H02J 50/70*     (2016.01)
*B60L 53/122*    (2019.01)
(Continued)

(52) U.S. Cl.
CPC ............ *H02J 50/70* (2016.02); *B60L 53/122* (2019.02); *H01F 38/14* (2013.01); *H02J 50/005* (2020.01);
(Continued)

(58) Field of Classification Search
CPC . H02J 50/70; H02J 50/12; H02J 50/90; B60L 50/53; B60L 53/122; B60L 9/00; B60L 9/04; B60L 9/08
(Continued)

(56) References Cited

U.S. PATENT DOCUMENTS 4,836,344 A *  6/1989  Bolger ................... H02J 50/10
                                                  191/10
5,293,308 A *  3/1994  Boys ..................... H02M 5/458
                                                  324/392

(Continued)

*Primary Examiner* — Richard V Muralidar
(74) *Attorney, Agent, or Firm* — LEX IP MEISTER, PLLC

(57) ABSTRACT

A wireless charging power supply and pick-up system during operation of electric vehicles and industrial equipment while operating is described. The withstand voltage problem on the power supply line was solved by the capacitor provided in the inverter, and the power supply line and common line arrangement. This makes it possible to extend the wireless power supply line and the economical problem of the wireless charging system is greatly improved.

In the prior art, compatibility was maintained with various wireless charging pick-up pads installed in the vehicle by using a plurality of inverters. In this system, compatibility is satisfied at a lower cost by utilizing the relay present in the inverter. The EMI of the power supply line is reduced by maximizing the magnetic field cancellation effect by using the structure of the common line and the shielding tube. In addition, it improves the limitation of the length of the power supply line section and the problem of the dead zone during wireless charging while driving.

15 Claims, 23 Drawing Sheets

(51) Int. Cl.
  *H01F 38/14*  (2006.01)
  *H02J 50/00*  (2016.01)
  *H02J 50/12*  (2016.01)
  *H02J 50/40*  (2016.01)
  *H02J 50/90*  (2016.01)

(52) U.S. Cl.
  CPC ............ *H02J 50/12* (2016.02); *H02J 50/402* (2020.01); *H02J 50/90* (2016.02)

(58) Field of Classification Search
  USPC ........ 320/108, 109; 307/10.1, 104; 191/2–8, 191/10, 13, 14
  See application file for complete search history.

(56) References Cited

U.S. PATENT DOCUMENTS

| | | | | |
|---|---|---|---|---|
| 5,573,090 | A * | 11/1996 | Ross | B60L 5/005 |
| | | | | 320/109 |
| 6,879,889 | B2 * | 4/2005 | Ross | B60L 50/51 |
| | | | | 342/357.31 |
| 10,325,717 | B2 * | 6/2019 | Boys | B60L 5/005 |
| 2012/0217111 | A1 * | 8/2012 | Boys | H01F 38/14 |
| | | | | 191/10 |

* cited by examiner

[Figure 1]
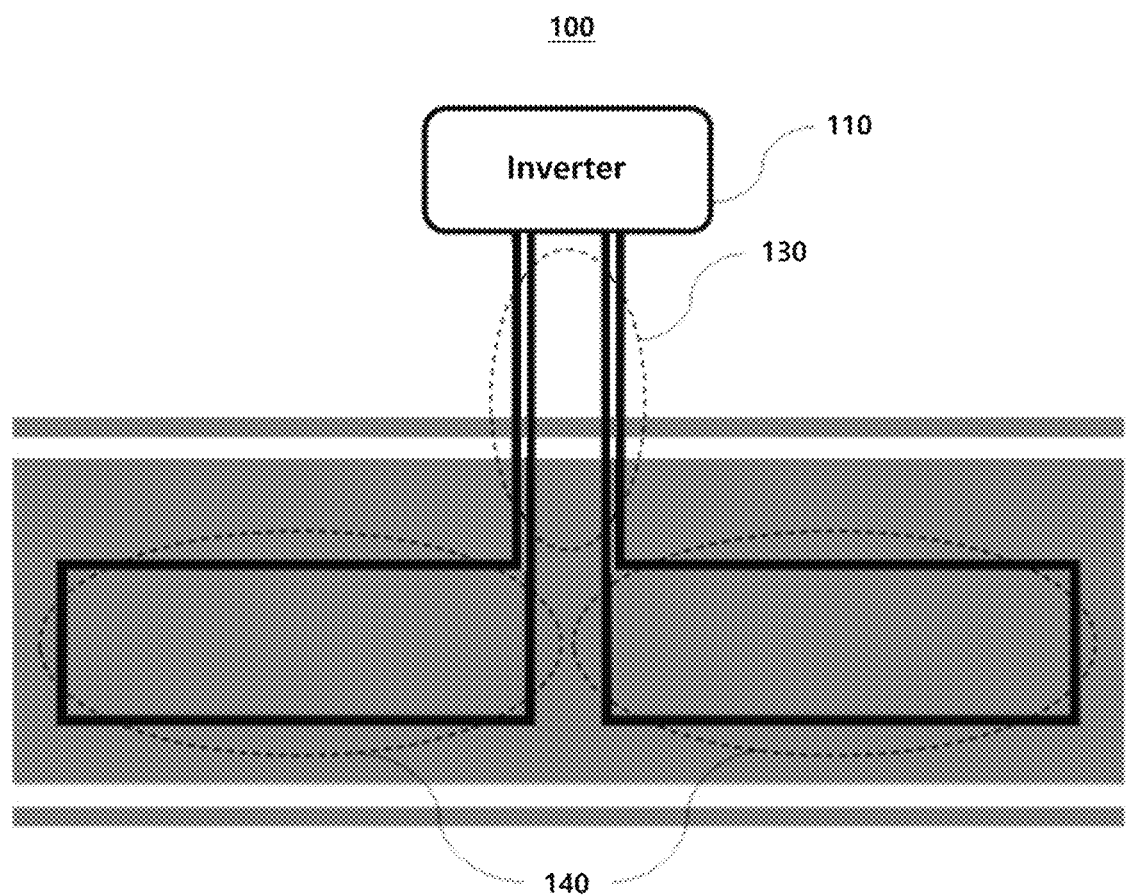

[Figure 2]
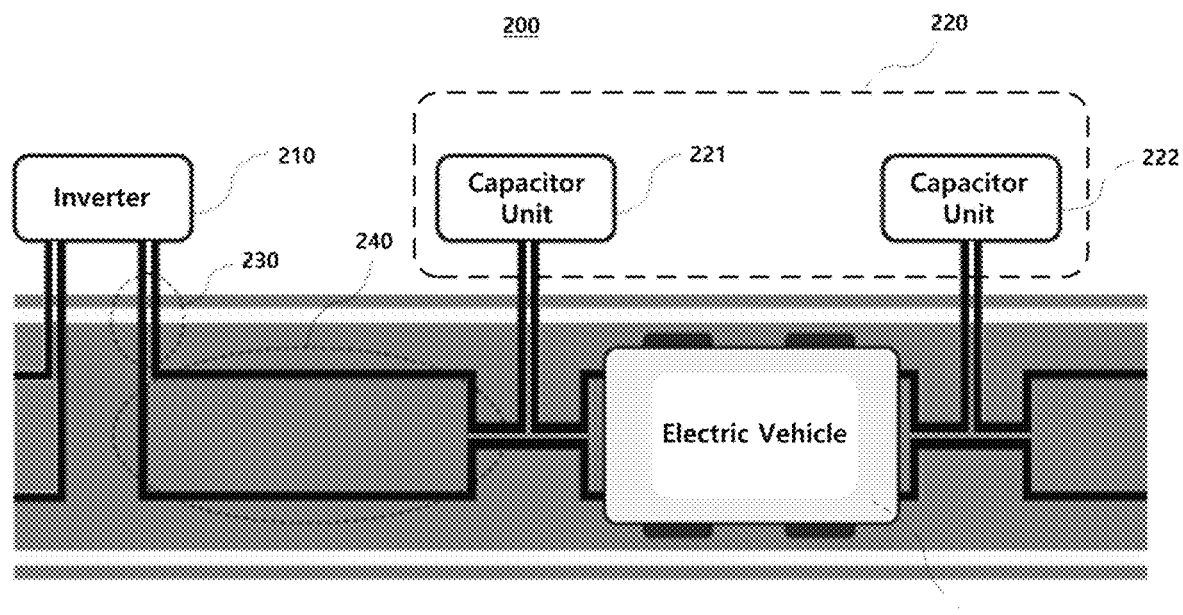

[Figure 3]
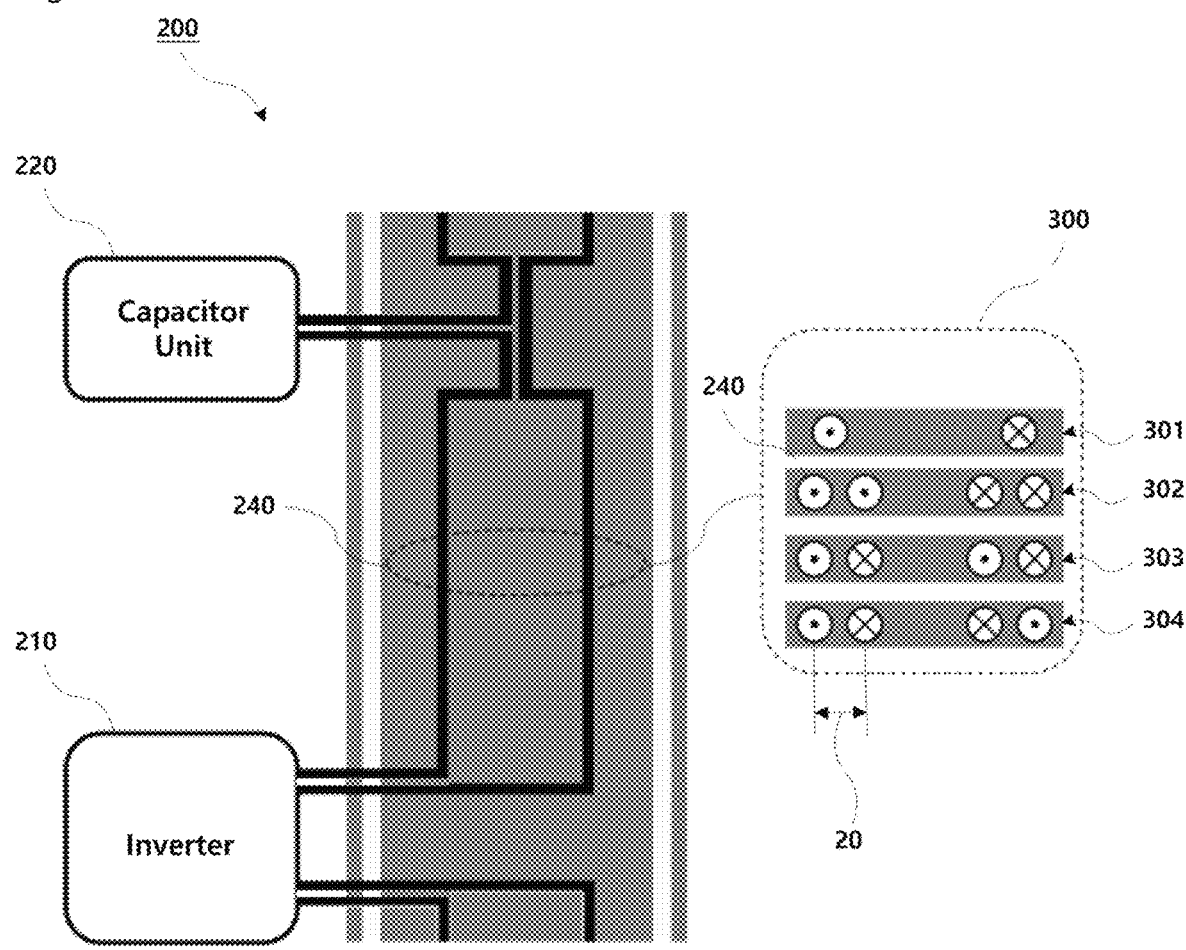

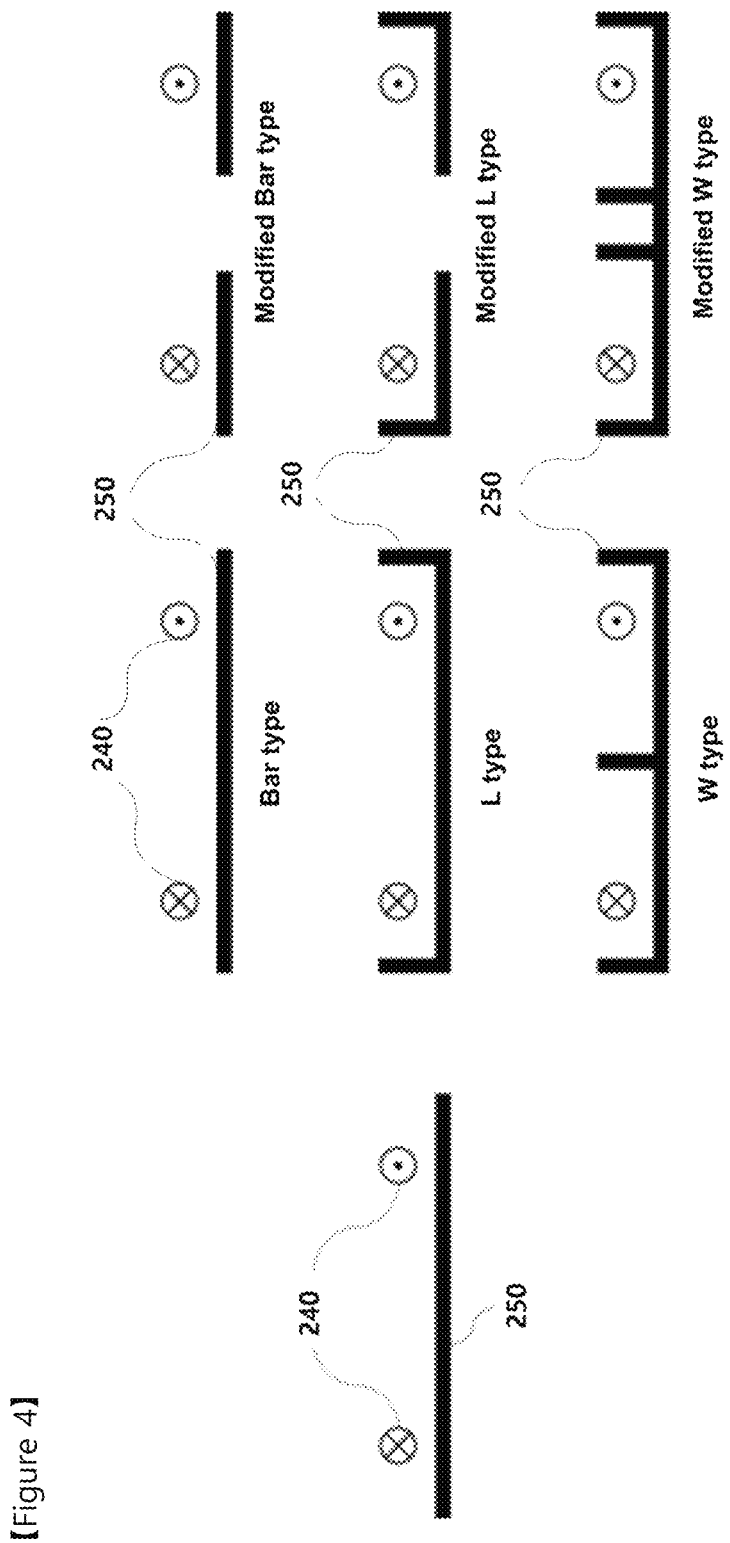
[Figure 4]

[Figure 5]
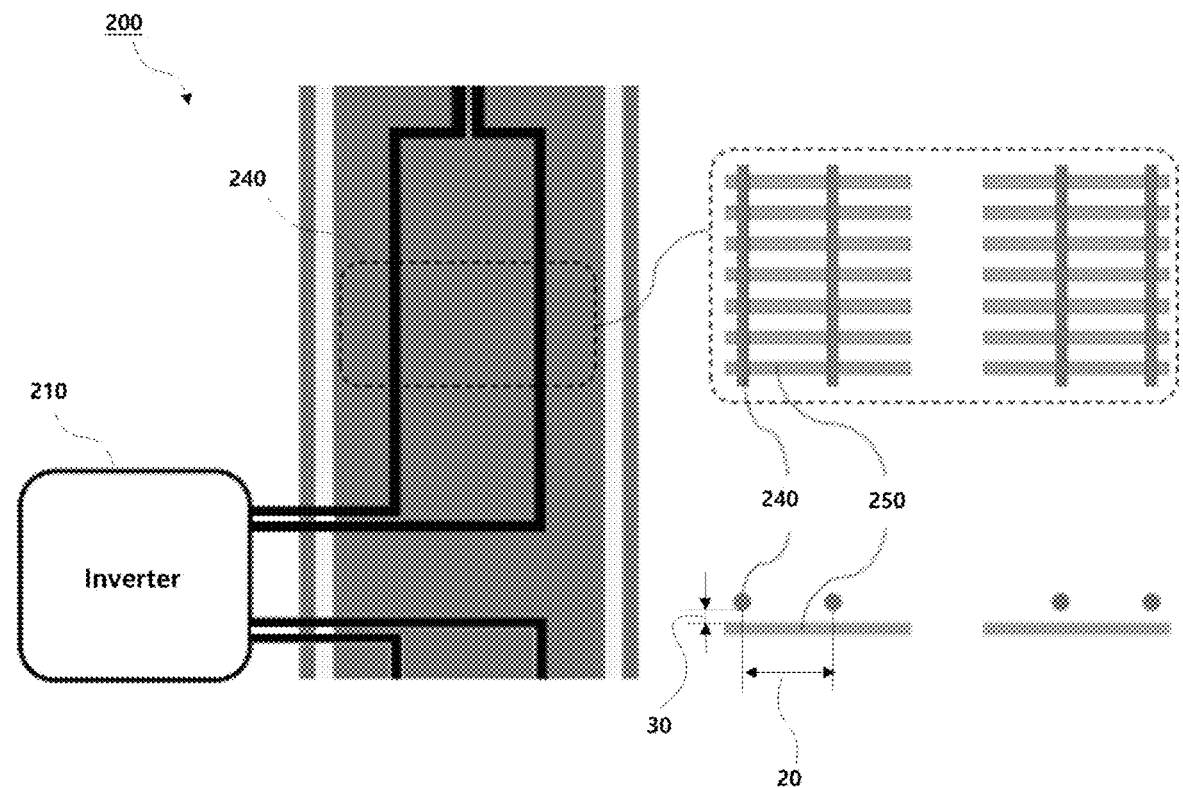
[Figure 6]
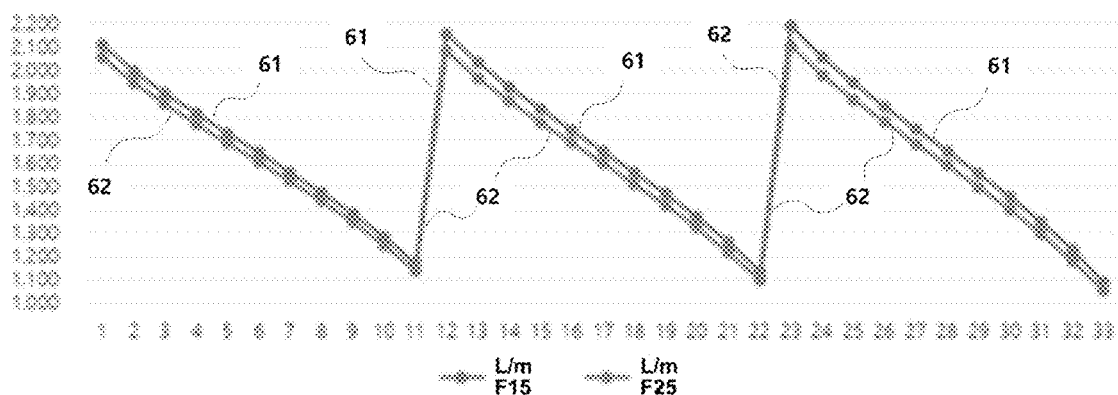

【Figure 7A】
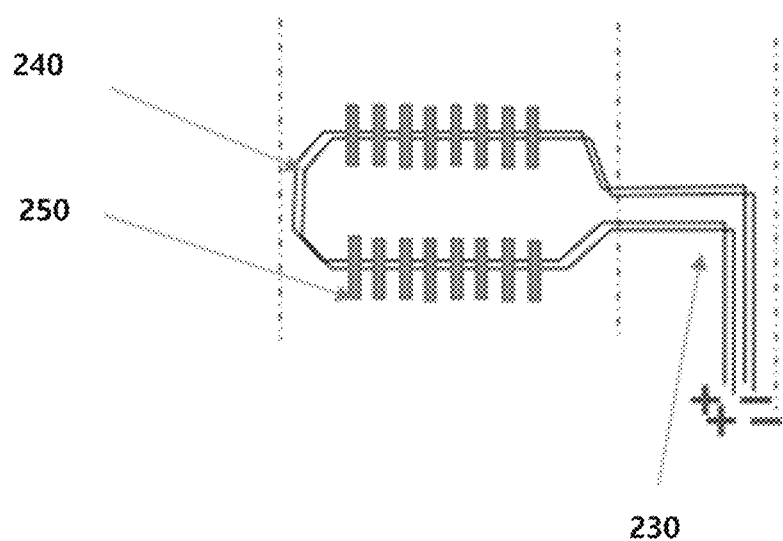
【Figure 7B】
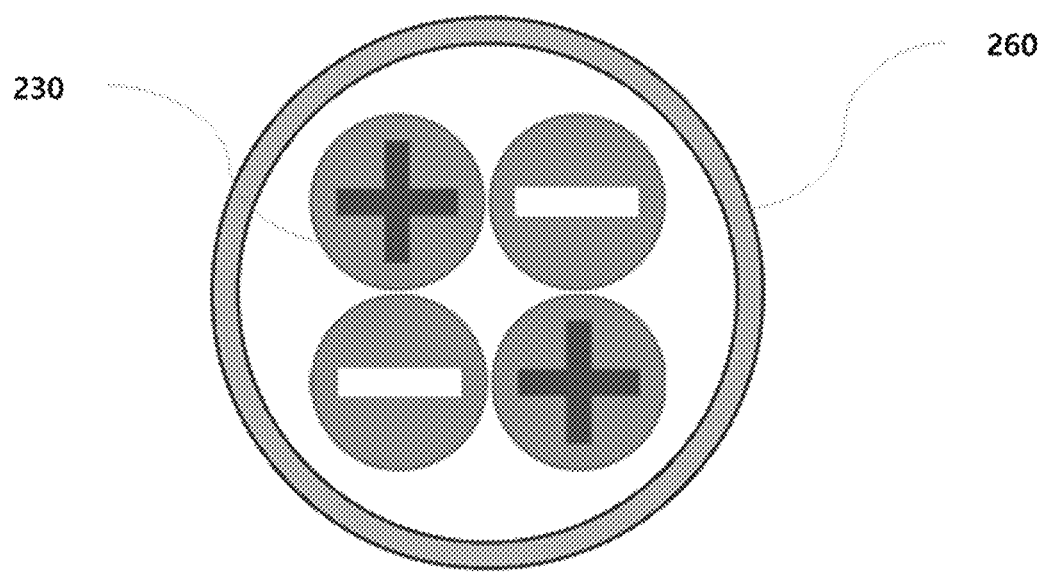

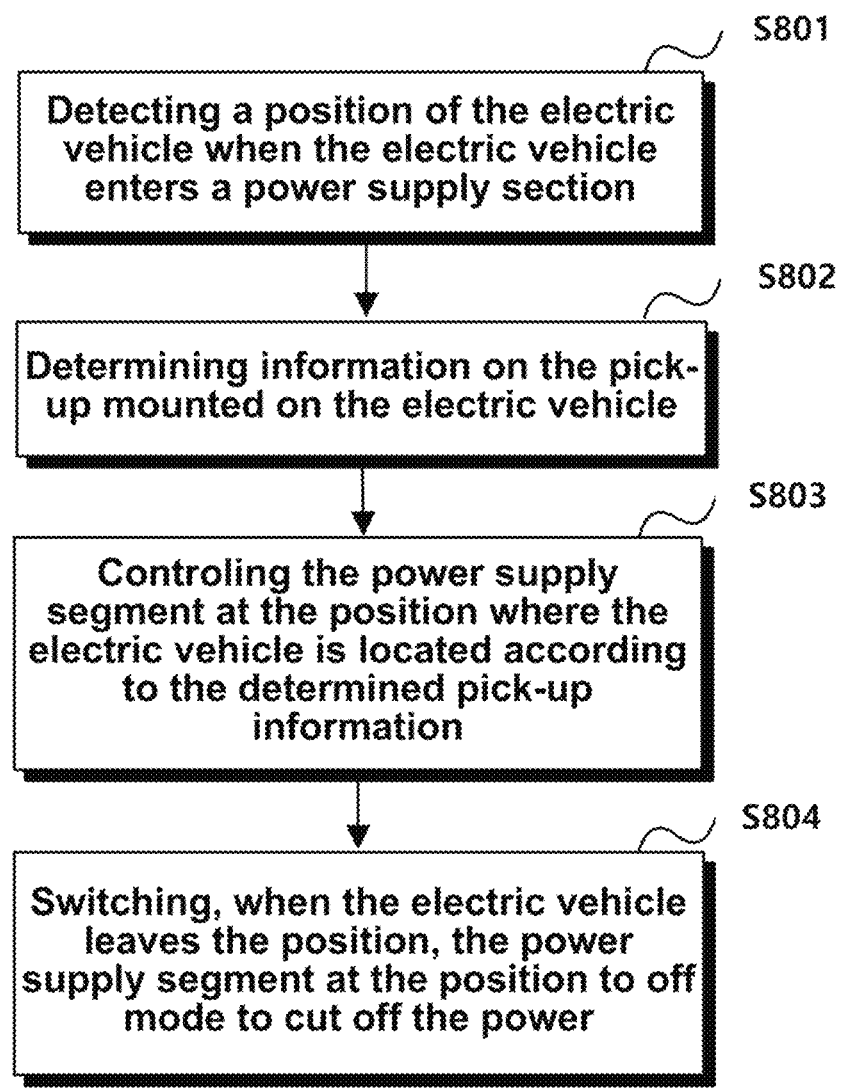
[Figure 8]

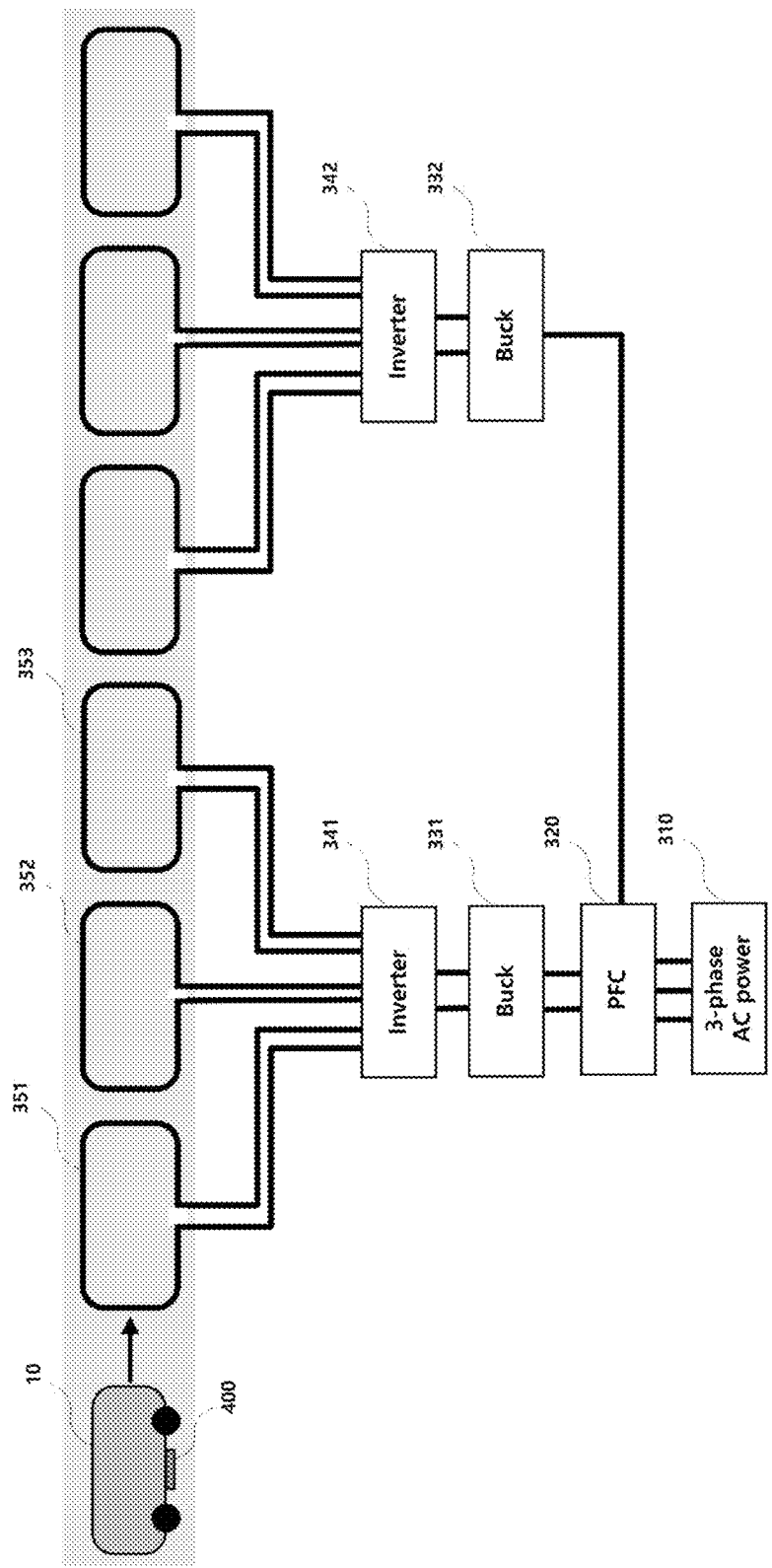
[Figure 9]

[Figure 10A]
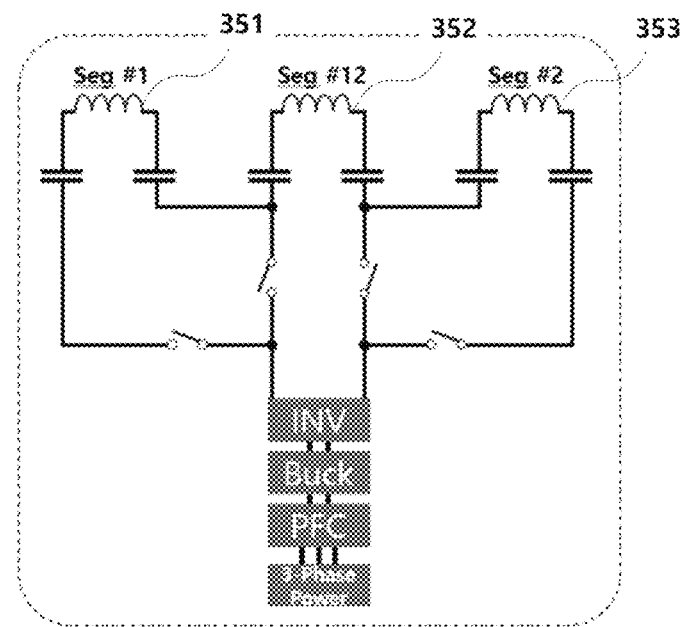
[Figure 10B]
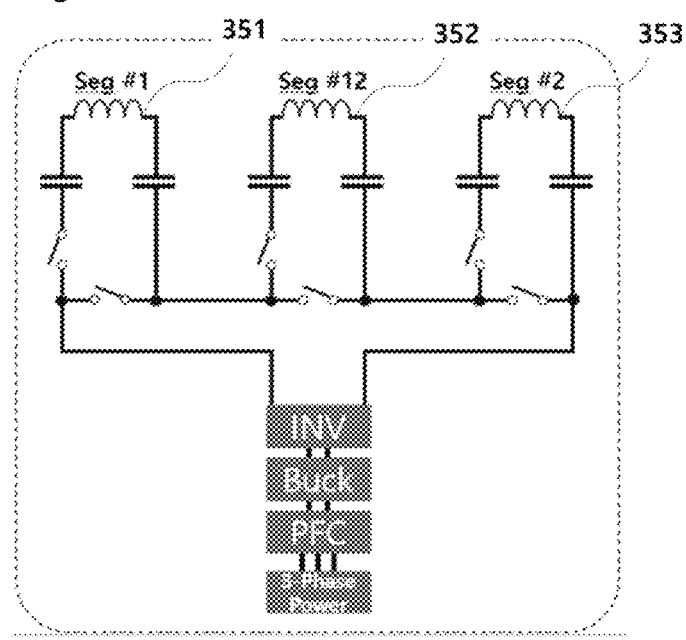

[Figure 11A]
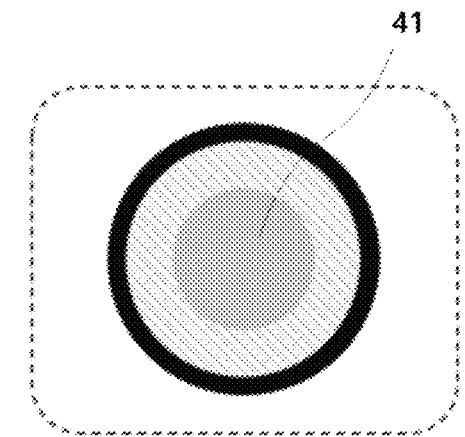
[Figure 11B]
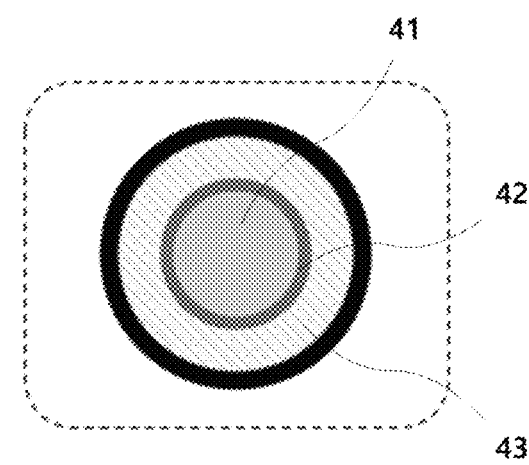

[Figure 12A]
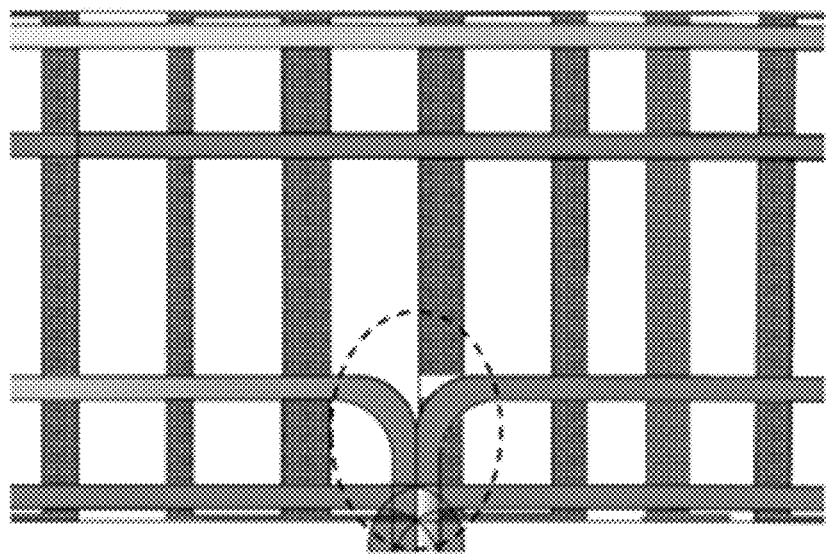
[Figure 12B]
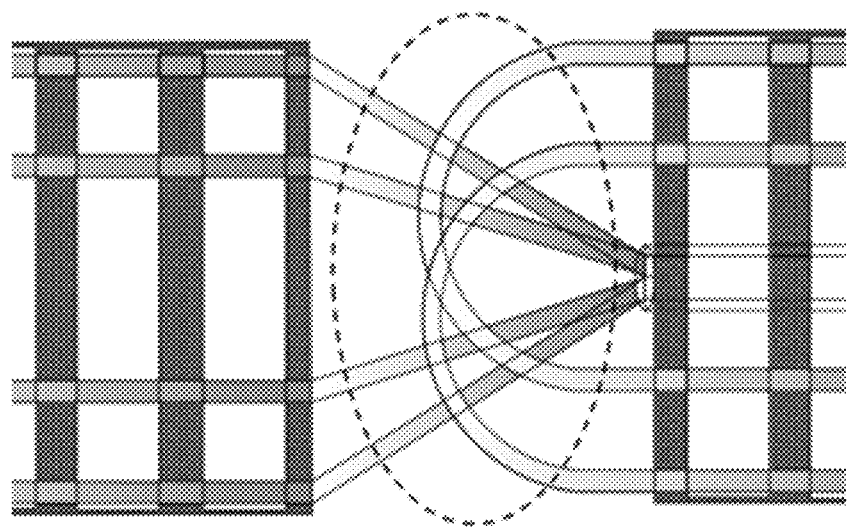

[Figure 12C]
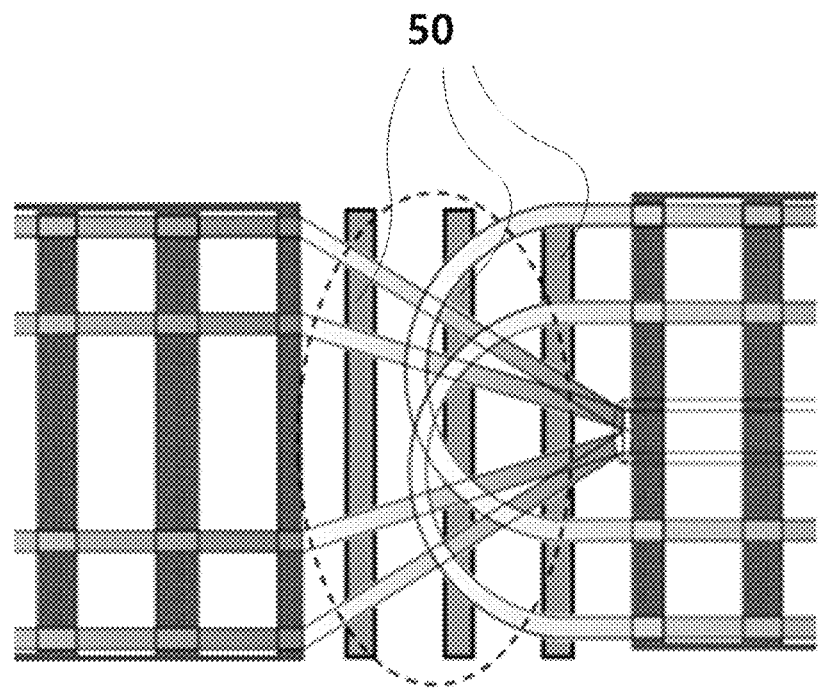
[Figure 12D]
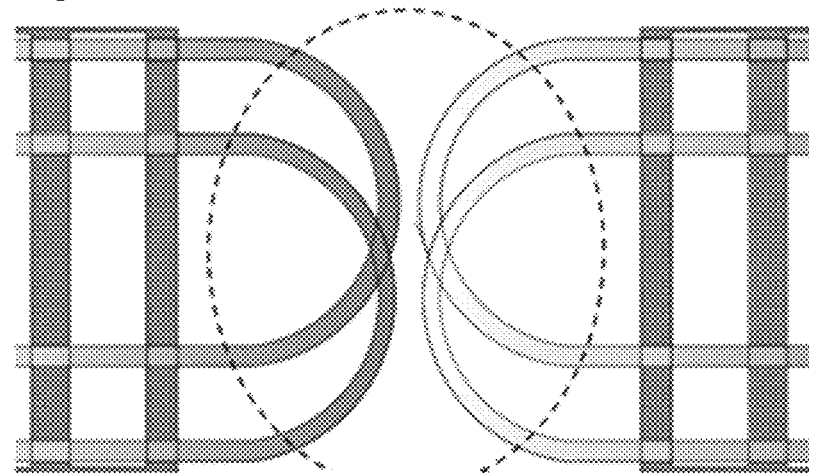

【Figure 12E】
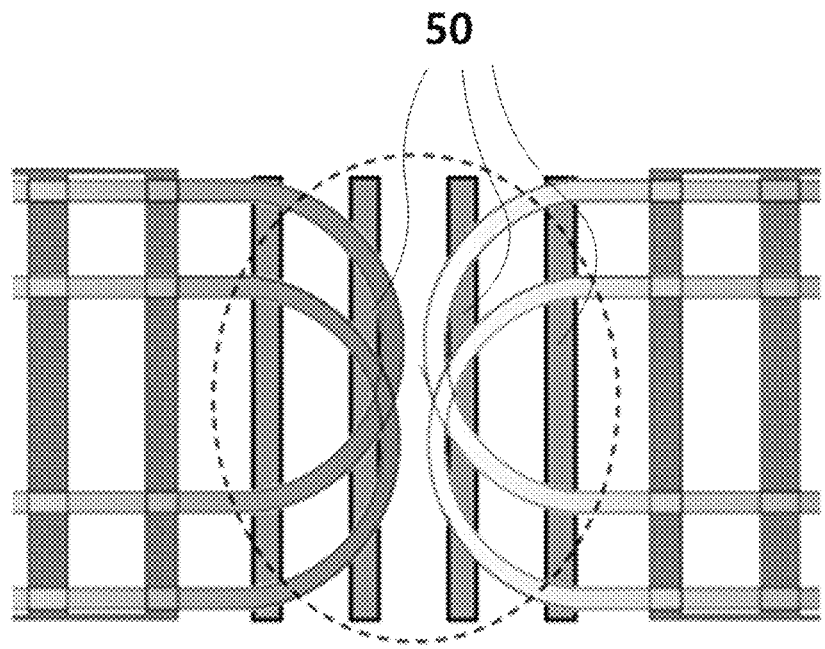
【Figure 13】
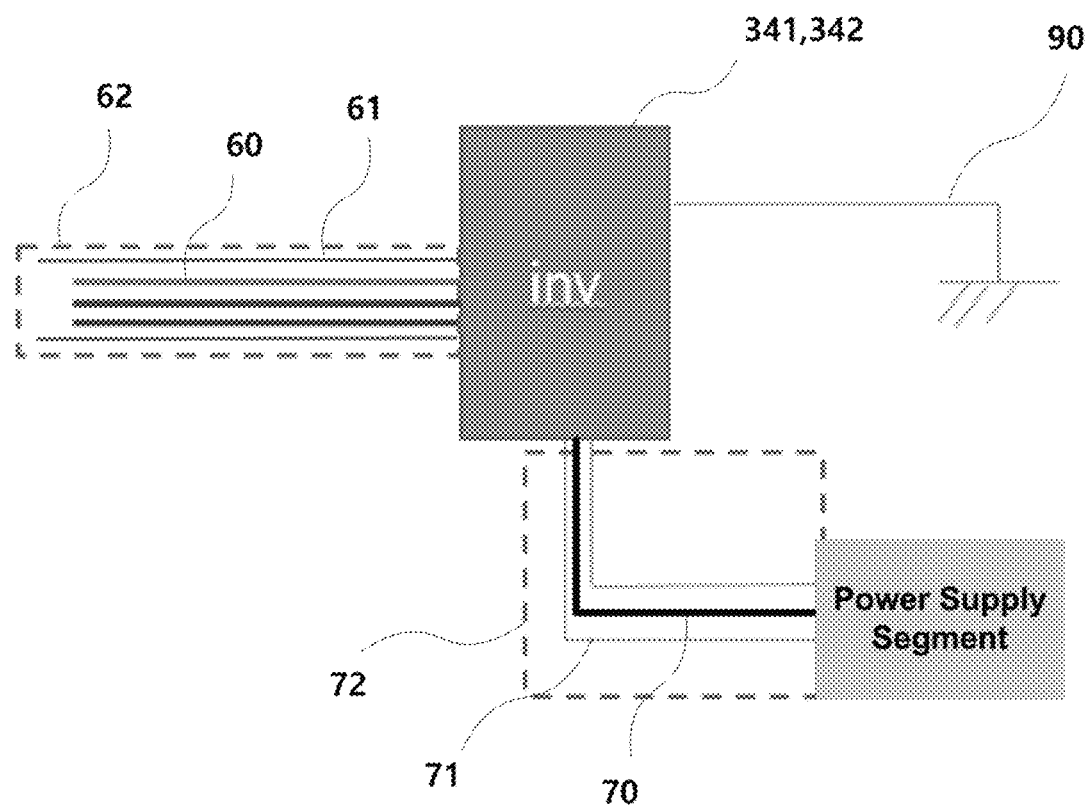

[Figure 14]
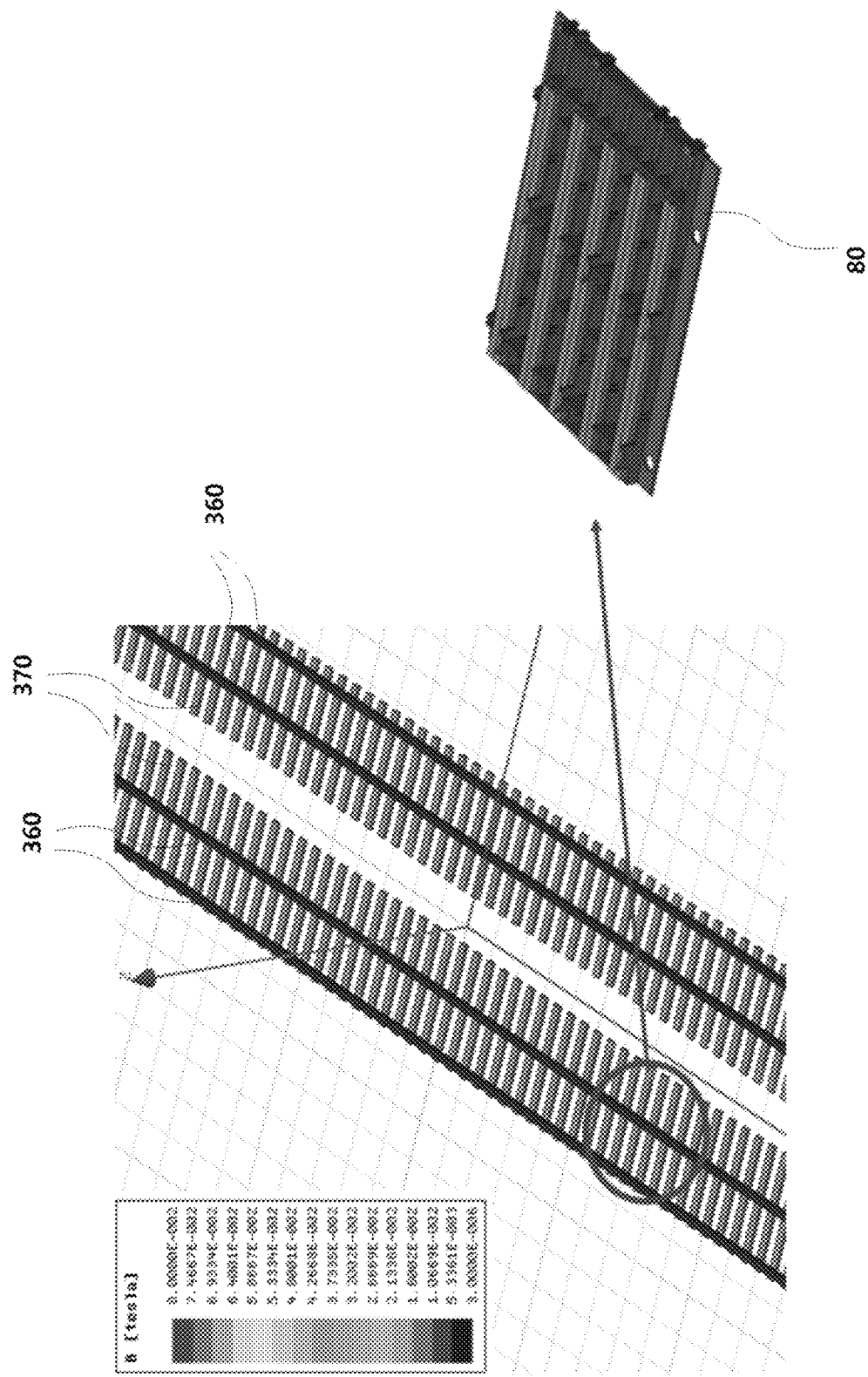

[Figure 15]
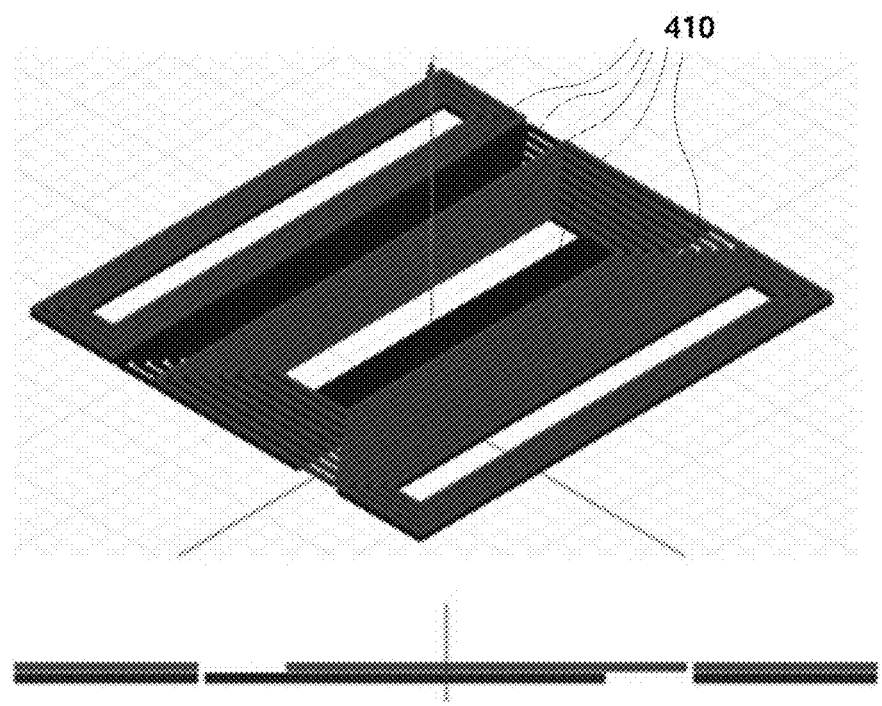

[Figure 16]
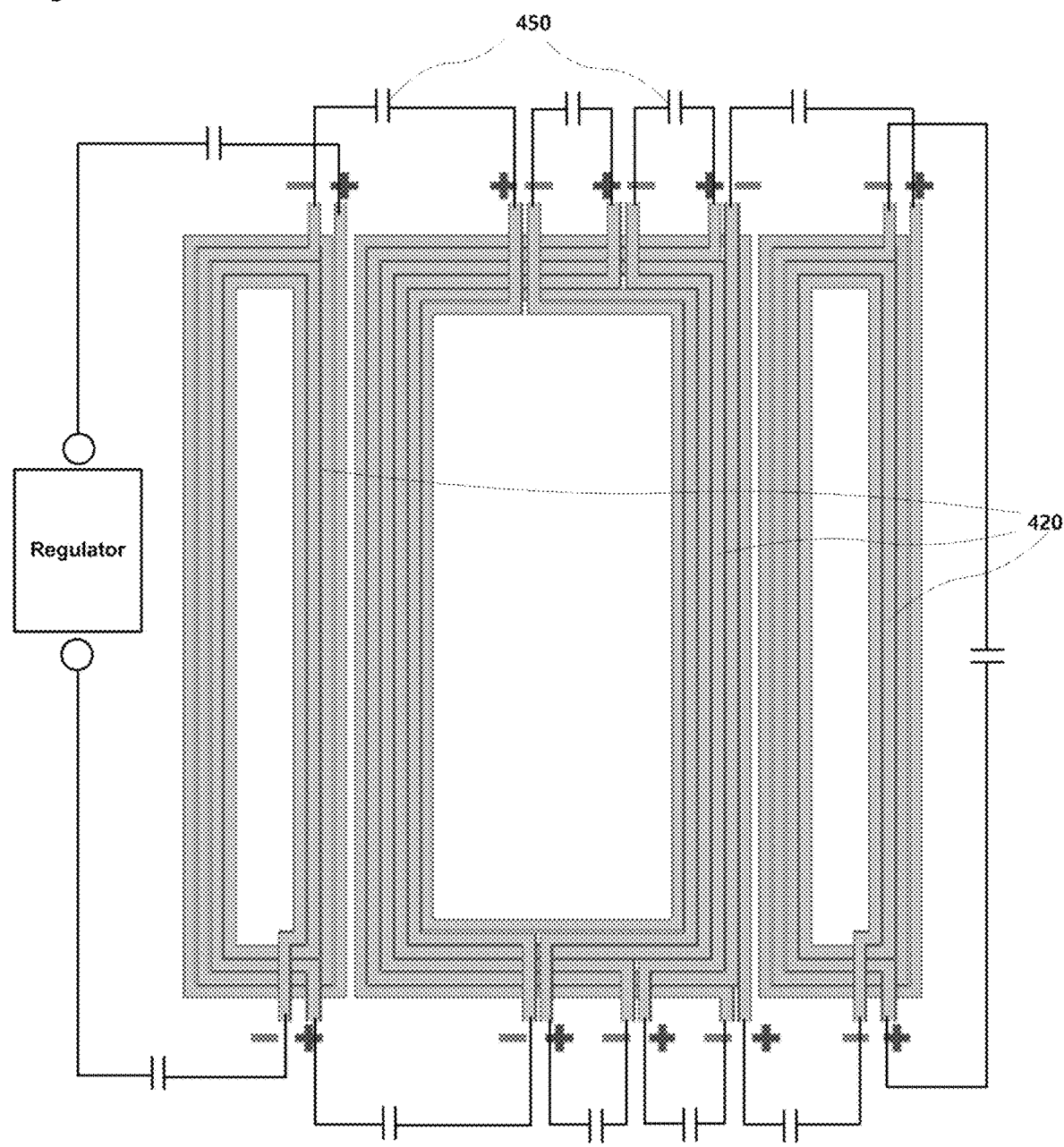

[Figure 17A]
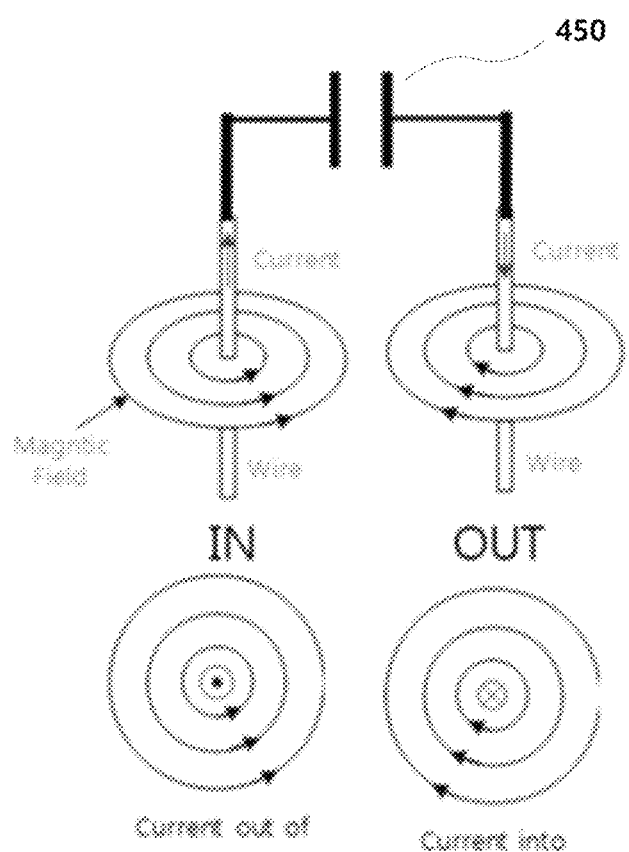

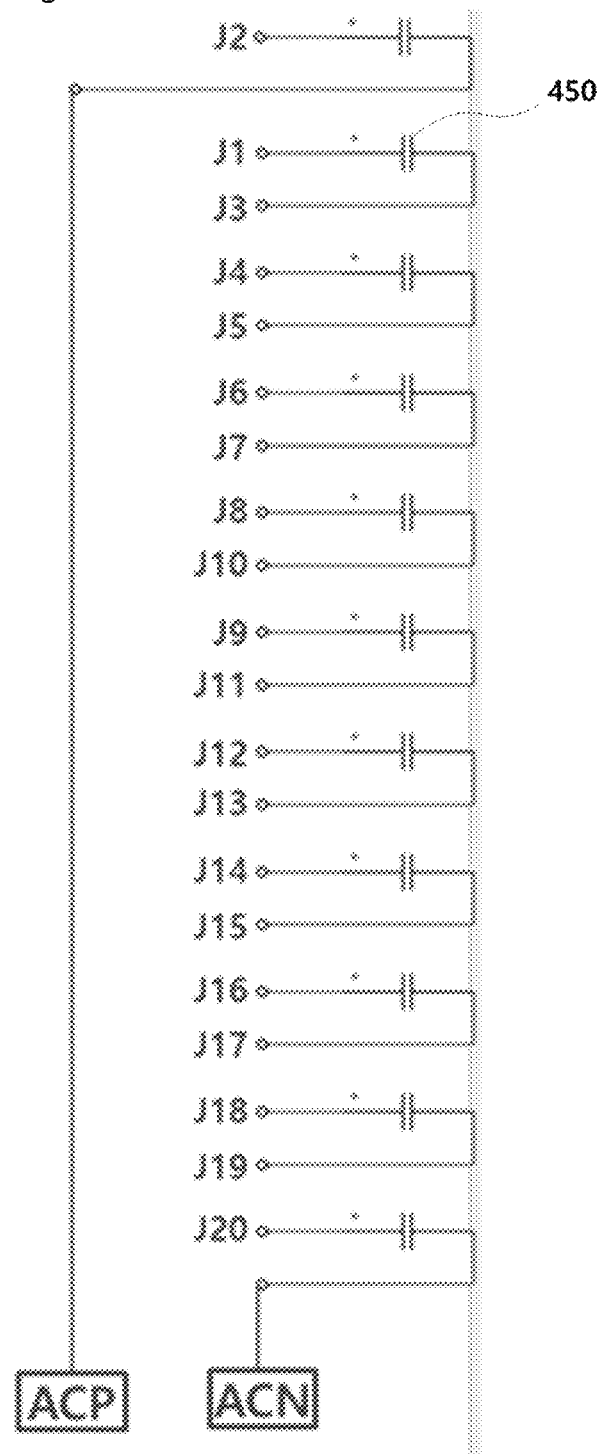
[Figure 17B]

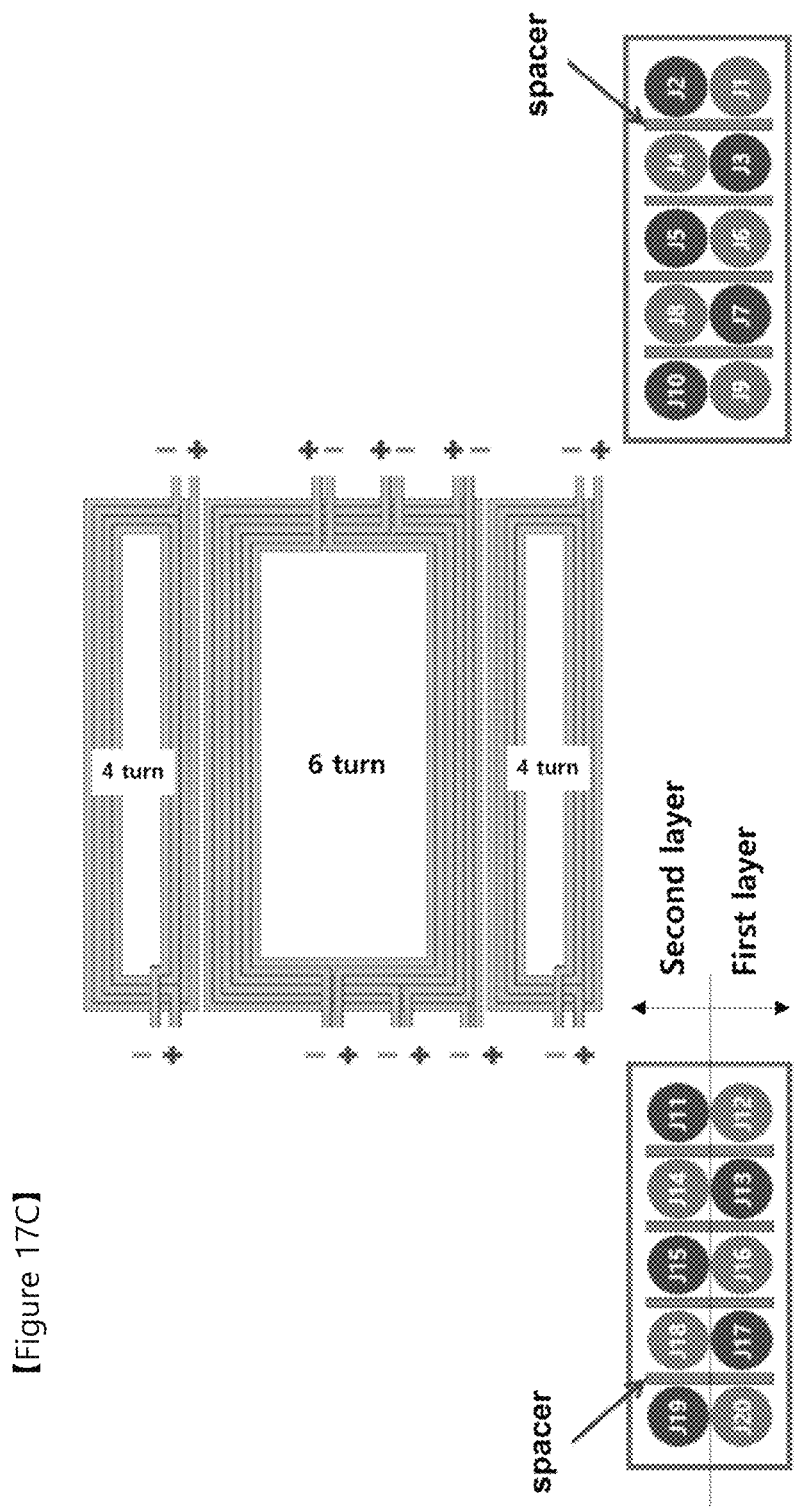
[Figure 17C]

[Figure 18]
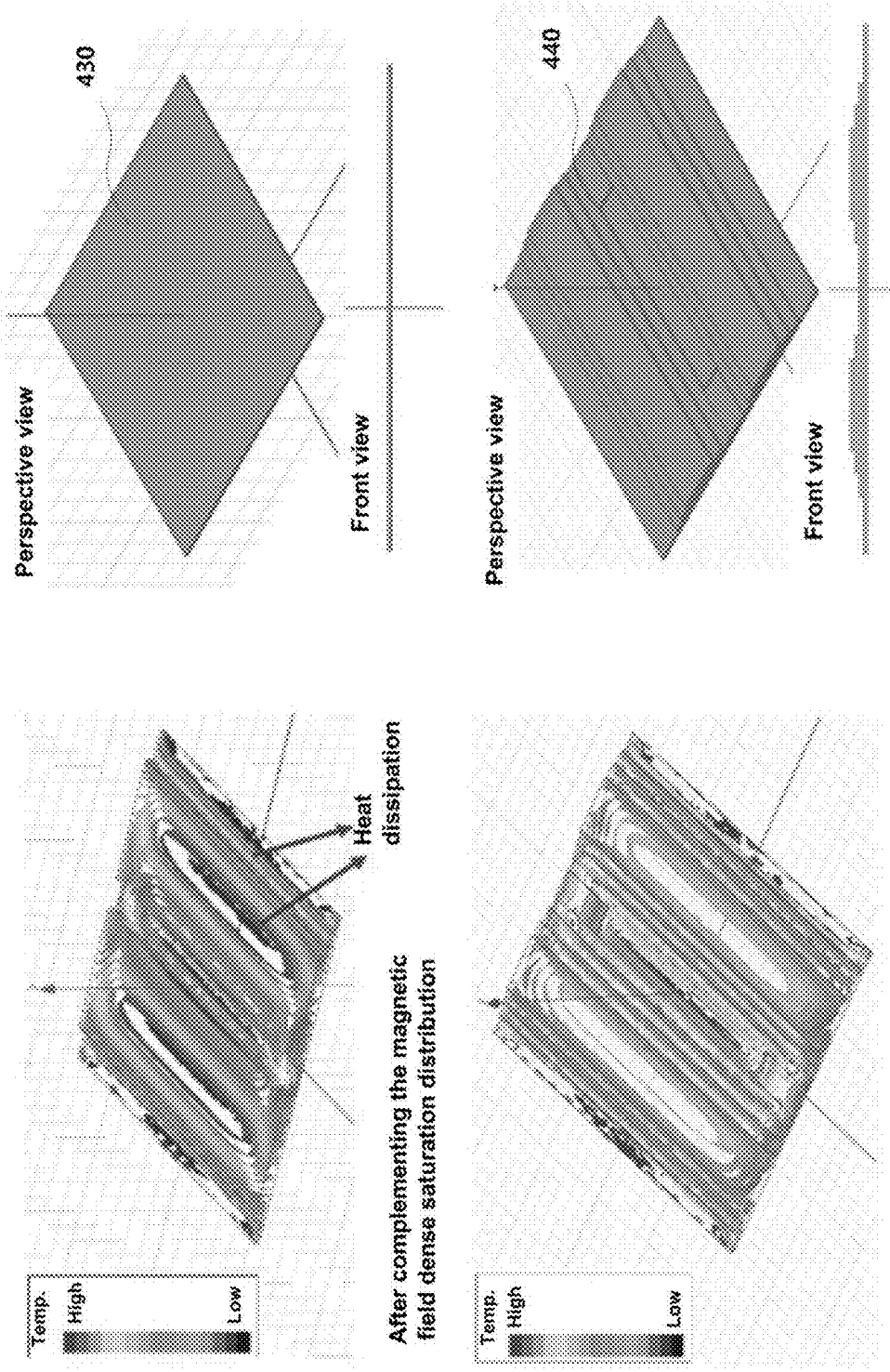

[Figure 19]
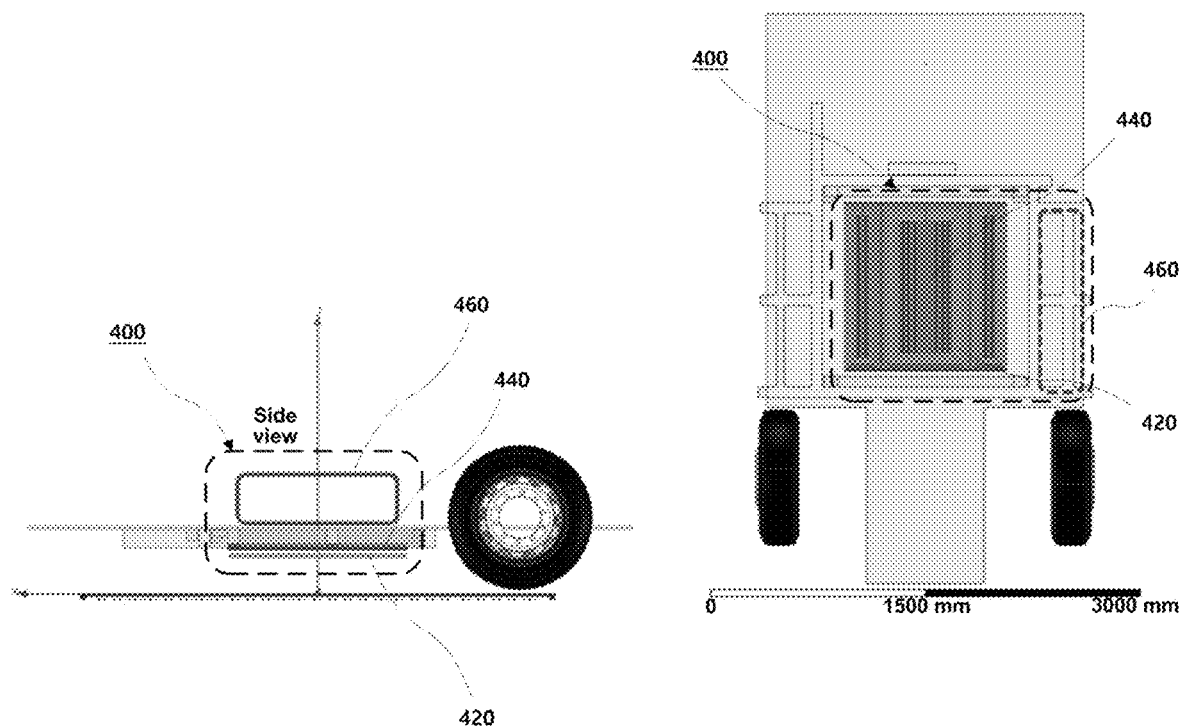

[Figure 20A]
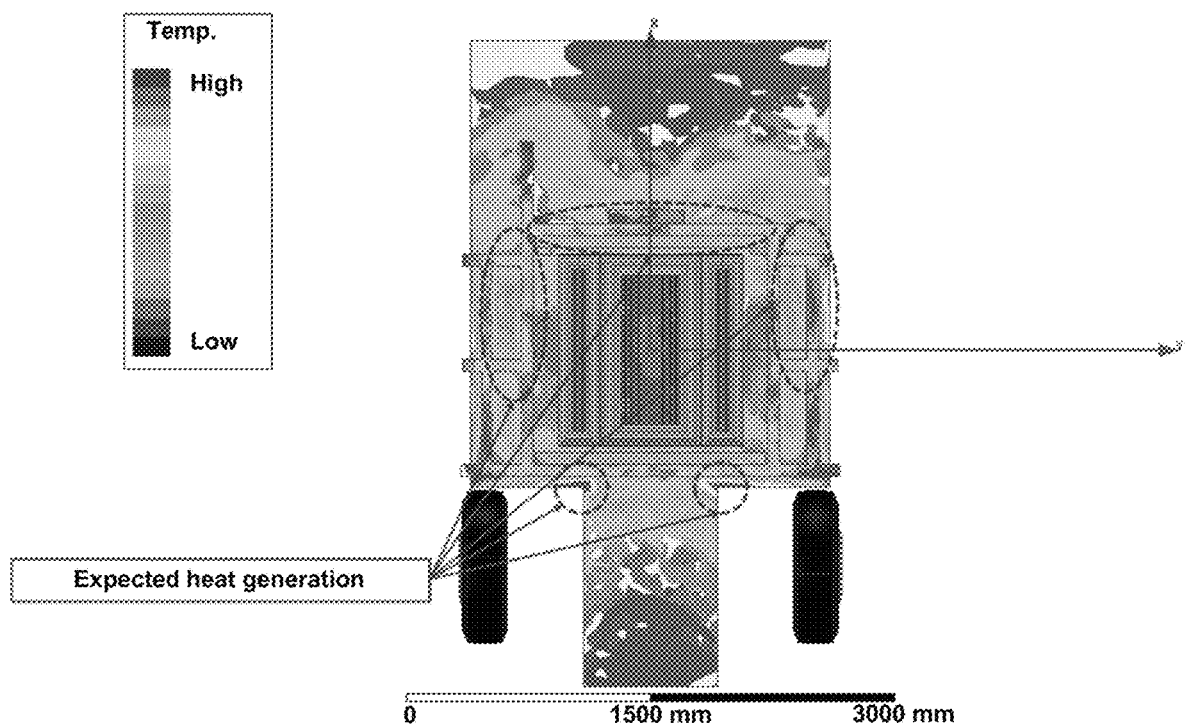
[Figure 20B]
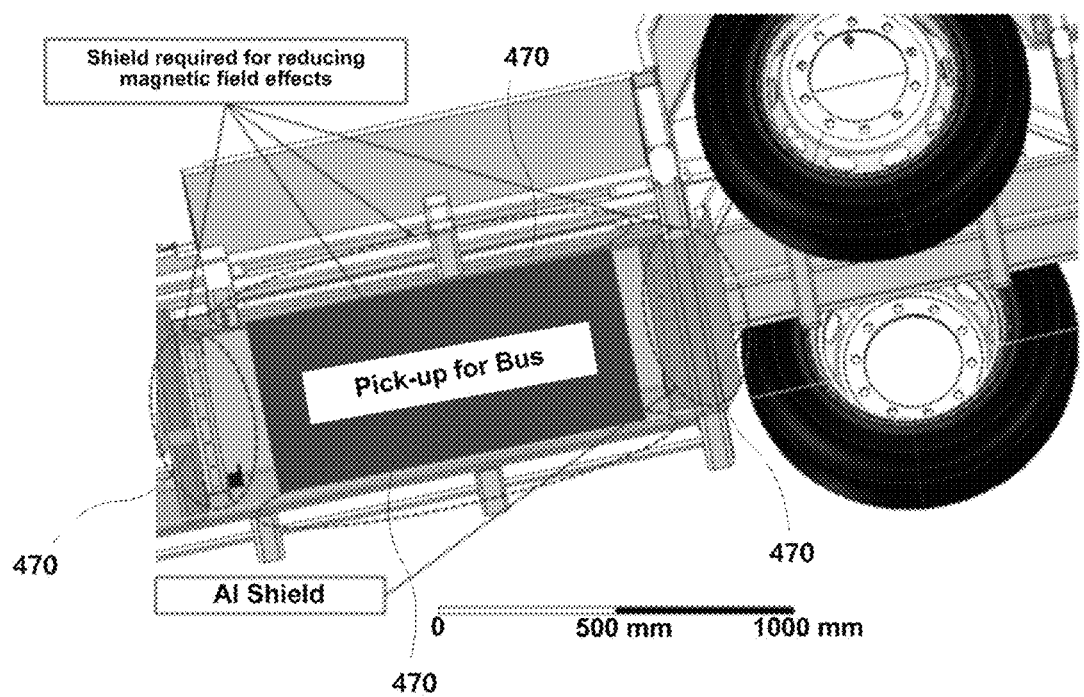

[Figure 21A]
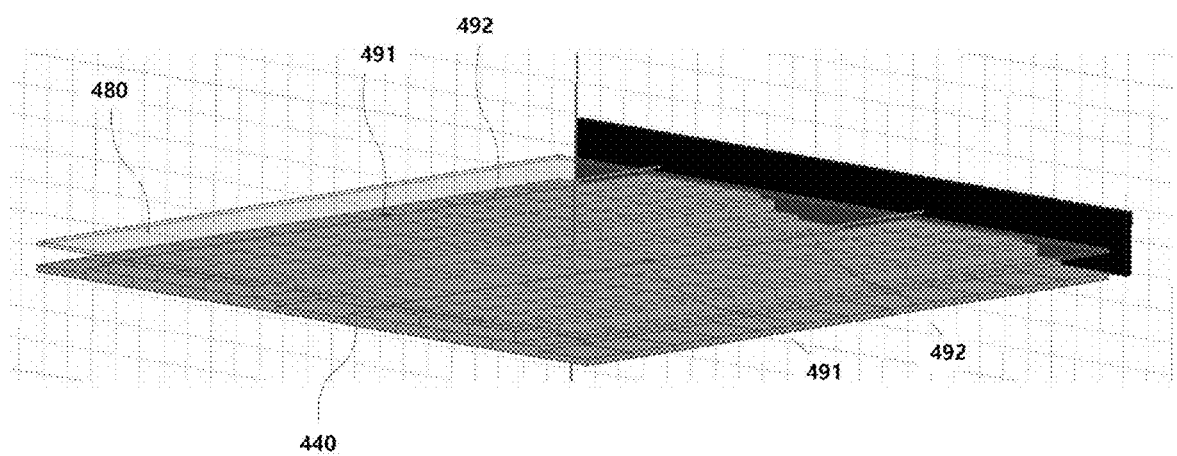
[Figure 21B]
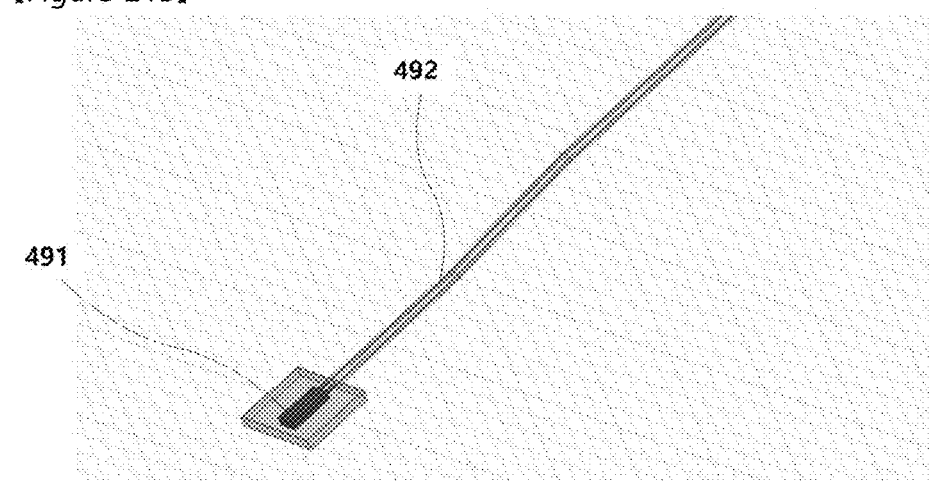

WIRELESS CHARGING POWER SUPPLY SYSTEM AND PICK-UP SYSTEM DURING RUNNING OF ELECTRIC VEHICLES AND INDUSTRIAL EQUIPMENT

BACKGROUND OF THE INVENTION

1. Field of the Invention

The present invention relates to a wireless charging power supply and pick-up system, and more particularly, wireless charging power supply and pick-up system during operations of electric vehicles, such as electric buses, electric cars, trams, light rails, subways, and industrial equipment including RTGC (Rubber Tyred Gantry Crane).

2. Description of the Related Art

Due to global warming, the use of electric power using batteries as an energy source to replace petroleum energy is increasing for transportation means such as automobiles and railroads. Currently, there has been a limit to the more general distribution of electric vehicles due to the insufficient capacity of the battery, which requires a short driving range and frequent charging, as well as insufficient infrastructure such as charging stations and the long time required for charging. However, a power supply system has also been installed to enable wireless charging on the road while driving.

FIG. 1 is a diagram illustrating a power supply line of a wireless charging system 100 while driving of a conventional wireless charging electric vehicle. The power supply line is placed on the left and right with the inverter 101 as the center and is composed of a single coil. From the inverter 110, a sinusoidal current is applied to the power supply line composed of the common line portion 130 and the power supply region 140, and the applied current returns to the inverter 110.

In this configuration, it is possible to wirelessly charge electric vehicles and industrial equipment by composing a power supply line without too much trouble in the low frequency range (20-40 kHz). However, due to the weight and size of the wireless charging pad installed in the vehicle, EMF, and the limitations of wireless charging which is relatively expensive compared to wired charging, the frequency of wireless charging is being changed from 20-40 kHz to 85 kHz based on many studies. Although advantages can be secured according to the changed frequency, it has the disadvantage that the problem of withstand voltage for frequency increase always exists.

That is, if the frequency is increased from 20-40 kHz to 85 kHz according to the current wireless charging trend for electric vehicles, the withstand voltage between both ends in the same power supply line increases by about 4.25 times, which may cause problems such as discharge and leakage current, etc. In order to suppress this, a method of shortening the length of the power supply line or reducing the current used may be proposed. However, if the length is shortened, the charging time of the electric vehicle while driving is shortened, resulting in a problem that the charging amount is significantly reduced. Reducing the current may also be a solution, but when the current is reduced, a voltage lower than the battery voltage is formed as an excitation electromotive force, which may cause a problem in that charging the battery is not easy.

In addition to the frequency problem, in the case of the existing wireless charging power supply system 100 while driving an electric vehicle, a single coil is wound in one turn in the vehicle travel direction, so compatibility with wireless charging pads attached to other vehicles may be lacking.

SUMMARY OF THE INVENTION

The present invention was devised to solve such problems and the object of the present invention is to provide a wireless charging power supply and pick-up system that more effectively reduces the withstand voltage of the power supply line, improves the compatibility with various wireless charging pick-up pads installed in the vehicle in a way that further reduces the cost, and also reduces EMI (ElectroMagnetic Interference) of the power supply line.

Another object of the present invention is to provide a new method for improving the limitation of the power supply line section length and the problem of dead zones during wireless charging while driving.

To achieve the above-mentioned objects, in accordance with one aspect of the present invention, there is provided a system for controlling the wireless charging power of electric vehicles and industrial equipment (hereinafter, collectively referred to as 'electric vehicles') in operation equipped with a pick-up, comprising: a power supply segment including a power supply cable through which an alternating current flows and a power supply core composed of a ferromagnetic material for effectively transferring the power generated from the power supply cable to a pick-up system; and, an inverter connected to a plurality of the power supply segments and controlling the supply of AC current flowing through the power supply cables of the respective power supply segments, wherein two or more inverters adjacent to each other share a power factor correction of 3-phase AC power.

In accordance with other aspect of the present invention, there is provided a method of controlling power supply of the wireless charging power supply system, comprising the steps of: (a) detecting, by the inverter, a position of the electric vehicle equipped with a pick-up when the electric vehicle enters a power supply section controlled by the inverter; (b) determining, by the inverter, information on the pick-up mounted on the electric vehicle; (c) switching, by the inverter, the power supply segment at the position where the electric vehicle is located to a charging mode according to the determined pick-up information, and controlling the power to be supplied to the power supply segment; and, (d) switching, by the inverter, when the electric vehicle leaves the position, the power supply segment at the position to off mode to cut off the power.

In accordance with another aspect of the present invention, there is provided a pick-up system installed under the electric vehicle and wirelessly collecting power from the wireless charging power supply system of claim 1, comprising: a pick-up cable for generating an induced voltage in cooperation with the wireless charging power supply system; a pick-up core composed of a ferromagnetic material for effectively generating an induced voltage in the pick-up cable; and, capacitor for withstand voltage branching to reduce withstand voltage for the pick-up cable, wherein the pick-up core has a shape that reduces magnetic field density, thereby reducing the possibility of heat generation.

According to the present invention, it is possible to expand the wireless power supply line while driving by solving the conventional withstand voltage problem on the power supply line with a capacitor provided in a 'box' or an 'inverter' located outside the road, a power supply line design, and a common line arrangement design. According to this scalability, there is an effect of greatly improving the economic problem of the wireless charging system.

At the same time, in contrast to the conventional method of maintaining compatibility with various wireless charging pick-up pads installed in the vehicle by using multiple inverters, a wireless charging pick-up system that satisfies such compatibility at a lower cost is provided by utilizing the relays present in the 'box' and 'inverter'.

Furthermore, there is an effect of reducing EMI (Electro-Magnetic Interference) of the power supply line by maximizing the magnetic field cancellation effect by the design of the common line and the shielding tube.

In addition, the present invention has an effect of providing a new method for improving the limitation of the length of the power supply line section and the problem of dead zones during wireless charging while driving.

BRIEF DESCRIPTION OF THE DRAWINGS

FIG. 1 is a view showing a power supply line of a conventional wireless charging power supply system.

FIG. 2 is a schematic diagram showing a wireless charging power supply system according to the first embodiment of the present invention when an electric vehicle is on a road.

FIG. 3 is a view showing the coil structure of the power supply line of the wireless charging power supply system according to the first embodiment of the present invention.

FIG. 4 is a view showing the shape and structure of a ferromagnetic material forming a power supply core of the wireless charging power supply system according to the first embodiment of the present invention.

FIG. 5 is a diagram illustrating a distance between coils, which is a design variable, and a distance between a coil and a ferromagnetic material, which is a power supply core, of the wireless charging power supply system according to the first embodiment of the present invention.

FIG. 6 is a graph showing changes in inductance per unit distance of a power supply line according to design variables shown in FIG. 5.

FIG. 7A is a view illustrating a method of installing a common line portion in the wireless charging power supply system according to the present invention.

FIG. 7B is a view showing the magnetic field cancellation effect by adjusting the direction of the current in the wireless charging power supply system according to the present invention.

FIG. 8 is a flowchart illustrating a power supply control method in the wireless charging power supply system according to the first embodiment of the present invention.

FIG. 9 is a schematic diagram illustrating a wireless charging power supply system according to the second embodiment of the present invention when an electric vehicle is on a road.

FIG. 10A is a circuit diagram illustrating one embodiment of a structure for controlling each of the power supply segments of the power supply system of FIG. 9.

FIG. 10B is a circuit diagram illustrating another embodiment of a structure for controlling each of the power supply segments of the power supply system of FIG. 9.

FIG. 11A is a cross-sectional view illustrating an exemplary cable configuration for improving a cable withstand voltage characteristic used in a power supply line of a wireless charging power supply system according to the second embodiment shown in FIG. 9 when an electric vehicle is on a road.

FIG. 11B is a cross-sectional view illustrating another exemplary cable configuration for improving a cable withstand voltage characteristic used in a power supply line of a wireless charging power supply system according to the second embodiment shown in FIG. 9 when an electric vehicle is on a road.

FIG. 12A is a diagram illustrating one type of dead zone and an improvement plan for the dead zone in a power supply line of a wireless charging power supply system according to the second embodiment shown in FIG. 9 when an electric vehicle is on a road.

FIG. 12B is a diagram illustrating other type of dead zone and an improvement plan for the dead zone in a power supply line of a wireless charging power supply system according to the second embodiment shown in FIG. 9 when an electric vehicle is on a road.

FIG. 12C is a diagram illustrating another type of dead zone and an improvement plan for the dead zone in a power supply line of a wireless charging power supply system according to the second embodiment shown in FIG. 9 when an electric vehicle is on a road.

FIG. 12D is a diagram illustrating another type of dead zone and an improvement plan for the dead zone in a power supply line of a wireless charging power supply system according to the second embodiment shown in FIG. 9 when an electric vehicle is on a road.

FIG. 12E is a diagram illustrating another type of dead zone and an improvement plan for the dead zone in a power supply line of a wireless charging power supply system according to the second embodiment shown in FIG. 9 when an electric vehicle is on a road.

FIG. 13 is a view showing a shielding treatment for a portion of an input power line to an inverter and a common line of a power supply line in a wireless charging power supply system according to the second embodiment of the present invention when an electric vehicle is on a road.

FIG. 14 is a view showing an embodiment of a jig for the construction of a power supply core in a wireless charging power supply system according to the second embodiment of the present invention when an electric vehicle is on a road.

FIG. 15 is a view showing an embodiment of a cable configuration in the wireless charging pick-up system of the present invention.

FIG. 16 is a view showing another embodiment of the cable configuration in the wireless charging pick-up system of the present invention.

FIG. 17A is a view showing the arrangement of a capacitor for breakdown voltage branching in the wireless charging pick-up system of the present invention.

FIG. 17B is a view showing the arrangement of capacitors for breakdown voltage branching in the wireless charging pick-up system of the present invention.

FIG. 17C is a view showing the direction of the current in the wireless charging pick-up system of the present invention.

FIG. 18 is a diagram illustrating a structure of a ferromagnetic material and a magnetic field dense saturation distribution thereof in the wireless charging pick-up system of the present invention.

FIG. 19 is a view showing the installation position of the capacitor box in the wireless charging pick-up system of the present invention.

FIG. 20A is a view showing a simulation result for the prediction of induction heating around the pick-up system in the wireless charging pick-up system of the present invention.

FIG. 20B shows the installation state of the magnetic shield plate for preventing the induction heating shown in FIG. 20A.

FIG. 21A is a view showing an embodiment of the installation form of the sensor for detecting the heat of the ferromagnetic material in the wireless charging pick-up system of the present invention.

FIG. 21B is an enlarged view of the OT sensor and the signal line of FIG. 21A.

DETAILED DESCRIPTION OF THE INVENTION

Hereinafter, preferred embodiments of the present invention will be described in detail with reference to the accompanying drawings. The terms or words used in the present specification and claims should not be construed as being limited to conventional or dictionary meanings and, based on the principle that the inventor can appropriately define the concept of a term in order to explain his invention in the best way, it should be interpreted as a meaning and concept consistent with the technical idea of the present invention. The embodiments described in the present specification and the configurations shown in the drawings are only the most preferred embodiment of the present invention and do not represent all the technical spirit of the present invention. So at the time of the present application, it should be understood that various equivalents and modifications may be substituted for them at the time of filing the present application.

FIG. 2 is a schematic diagram illustrating a wireless charging power supply system according to a first embodiment of the present invention when an electric vehicle is on a road. Hereinafter, 'power supply cable' or 'power supply coil' will be used interchangeably with the same meaning.

The wireless charging power supply system 200 according to the first embodiment of the present invention performs wireless power transfer of an electric vehicle 10 (bus, tram, train, passenger car, etc.). The power supply line includes a power supply unit composed of a plurality of power supply pads, an inverter 210 supplying AC power to the power supply unit, and a common line 230 connecting the inverter 210 and the power supply unit. The power supply unit includes a power supply core made of a ferromagnetic material and a power supply cable 240. The configuration of the inverter 210 or the box 220 of the wireless charging power supply system 200 of the present invention is not limited to the inverter or box, and may include a switch or other power device. Since these devices also implement the same functions as those implemented through an inverter or a box, they will be collectively referred to as the inverter 210 and box 220 in the following description. The term 'box' means a box comprising a circuit unit that includes a capacitor and a relay. Hereinafter, it will be referred to as a 'capacitor unit 220' to distinguish it from the inverter 210. Such a relay is also provided in the inverter 210. In the present invention, as shown in FIG. 2, the common line connecting the power supply unit and the inverter does not return but are extended and connected to the next inverter or capacitor unit 220. Similarly, even when two or more capacitor units 220 are provided (221, 222 . . . ), as shown in FIG. 2, the other end of the power supply cable having one end connected to the nth capacitor unit is connected to the (n+1)th capacitor unit without returning to the nth capacitor unit.

The wireless charging power supply system 200 of the present invention of FIG. 2 includes a power supply line having compatibility so that charging is possible even when various types of wireless charging pads are attached to various types of vehicles. When the power supply line is configured as shown in FIG. 2, the withstand voltage of the power supply line can be more effectively reduced through the capacitor provided in the inverter 210 or in the capacitor unit 220. The reason that the withstand voltage of the power supply line can be reduced is because the capacitor cancels the inductance generated in the power supply line.

Furthermore, an advantage of the present invention is that a plurality of inverters are not used to implement the above-described compatibility. When a plurality of inverters are used, a large amount of installation cost is incurred, thereby lowering the economic feasibility. In the present invention, such compatibility is sufficiently secured through one inverter 210 and one or more capacitor units 220 connected to the inverter 210 as shown in FIG. 2. That is, compatibility can be secured by changing the current phase through the relay disposed on the inverter 210 or the capacitor unit 220. A method of implementing such compatibility will be described later in detail with reference to FIG. 3.

In addition, the shape of the power supply line of the wireless charging power supply system 200 may have various shapes, including an oval or circular structure. As the power supply core, a ferromagnetic material such as a ferrite core may or may not be accompanied. When a ferromagnetic material is provided as a power supply core, an embodiment of the shape of such a ferromagnetic material will be described later with reference to FIG. 4.

In the coil structure of the power supply line, one coil may be configured as a pair or may be configured as two or more pairs, an example of which is shown in FIG. 3.

In the case of a power supply line composed of two or more pairs of coils, the current direction of each coil of the power supply line may be made in all possible combinations. An interval of a pair of coils or two or more pairs of coils may include various intervals including equal intervals, which will be described later with reference to FIGS. 3 and 5.

FIG. 3 is a view showing the coil structure of the power supply line of the wireless charging power supply system 200 according to the first embodiment of the present invention and FIG. 4 is a diagram showing the shape and structure of a ferromagnetic material forming a power supply core of a wireless charging power supply system 200 according to the first embodiment of the present invention. The shape and structure of the ferromagnetic material may include bar-type, L-type, W-type, and all deformed shapes thereof.

In FIG. 3, a cross-section embodiment 300 of the power supply cable 240 constituting the power supply line, that is, a cross-section indicating the direction of current flowing in the power supply cable 240 is shown.

As shown in the cross-section embodiment 300, the power supply line may be composed of a single coil 301 or a plurality of coils 302, 303, 304. In the drawing, the direction in which the current flows out is indicated by and the direction in which the current flows in is indicated by X. In this drawing, only three examples of 301, 302, and 303 are illustrated in the case of using two coils, but any combination of two and two 'X' is of course possible.

According to the control of the relay of the inverter 210 and the relay of the capacitor unit 220, the direction of the current in each coil can be controlled as or 'X'. That is, according to the control of the relay of the inverter 210 and the relay of the capacitor unit 220, the phase of the current in each coil may be controlled to 0 or 180 degrees.

By controlling the phase of each coil, it is possible to generate wireless power by the magnetic flux transmitted to the upper part in the corresponding power supply line section to enter the charging mode, or to cancel the magnetic flux to cut off the power to the pick-up side (off mode). For example, in the case of 302 in FIG. 3, magnetic flux is generated from the current of the power supply cable 240, so that the pick-up is in the charging mode. However, in the case of 303, the pair of coils on the left side cancel each other out as currents of opposite phases, so that no power is generated for charging. Similarly, no power is generated on the pick-up by the pair of coils on the right.

In this way, the phase control of the current may perform various controls in addition to switching to the charging mode or the off mode. For example, in the case of 303 or 304 of FIG. 3, power may be generated on the pick-up according to the distance 20 between the two coils even if the phases of currents in the pair of coils on the left are opposite to each other. That is, if the two coils are arranged very close to each other, little power will be generated on the pick-up, but as the distance between the two coils is more than a certain interval, the generated power on the pick-up increases. As described above, depending on the distance between the coils 20 and the distance between the coil 240 and the lower power supply core 250 (30, see FIG. 5), the generated power when the same phase current flows through the pair of coils on both sides and the generated power when the opposite phase current flows change. Eventually, it will be possible to supply power to various pick-ups by controlling the power supply current according to various shapes.

The inverter 210 for controlling the magnitude and phase of the generated current turns on or off the wireless power generation of the corresponding section according to whether a vehicle is present in a specific segment of the power supply line section. In addition, by detecting the type of a pick-up device mounted on a vehicle passing through the section and the height of the pick-up that has a difference from the ground of the power supply line depending on a large vehicle or passenger car, etc., it is possible to control the phase of the current flowing in the power supply cable 240 (i.e., the coil 240 as shown in the embodiment 300 of FIG. 3) of the power supply line so that wireless power is supplied.

Such control of the phase of the current by the inverter 210 is performed by controlling the relay provided in the inverter 210 and the relay provided in the capacitor unit 220 of each section. That is, when the power supply cable 240 is composed of n (n≥2) pairs of coils, each coil can independently adjust the phase of the current by a relay under the control of the inverter 210. Any combination of 0 degree or 180 degree phase is possible for n pairs of coils. By controlling the current phase combination of the inverter 210 as described above, the wireless power supplied through the power supply cable is controlled.

As described above, for various types of pick-ups and installation heights of various pick-ups, it is called 'compatibility' as described above to automatically control and supply an appropriate amount of wireless power for charging.

In addition, the inductance of the power supply line can be reduced by controlling the phase.

FIG. 5 is a diagram showing a distance 20 between the coil 240 and a distance 30 between the coil 240 and the ferromagnetic material 250 that is a power supply core, which are design variables of the wireless charging power supply system 200 according to the first embodiment of the present invention. FIG. 6 is a graph showing a change in inductance per unit distance of a power supply line according to the design variable shown in FIG. 5.

FIG. 5 shows a method for securing compatibility according to the interval between coils constituting the power supply line and for extending the section due to the reduction of inductance. An advantageous condition can be determined by calculating an inductance value according to a change in the distance between the coils 20 and the distance 30 between the coil and the ferromagnetic material based on a unit distance. That is, each coil may be disposed to contact each other without a separation distance, or may be disposed to be spaced apart from each other by a predetermined distance. The coil constituting the power supply cable and the power supply core may also be disposed to contact each other without a separation distance, or may be disposed to be spaced apart from each other by a predetermined distance.

In FIG. 6, the F15 line 61 indicates that the separation distance 30 between the ferromagnetic material and the coil is 15 mm, and F25 line 62 indicates that the separation distance 30 between the ferromagnetic material and the coil is 25 mm. In addition, the value of the x-axis (horizontal axis) of the graph represents the distance 20 between the coils, and the y-axis (vertical axis) means inductance per unit length.

The 66 dots on each line in the graph show examples of a total of 66 designs for the design variables (20, 30) of the interval, and the appropriate design variable values according to the environment and various conditions in which the power supply line is installed can be set.

Each of FIGS. 7A and 7B is a diagram illustrating a method of locating a portion of the common line 230 in the wireless charging power supply system 200 according to the first embodiment of the present invention.

The common line refers to a portion where the power supply cables 240 are gathered, that is, a portion 230 (refer to FIG. 2) where the power supply cables are gathered from, for example, the inverter 210 or the capacitor unit 220. The common line 230 is wrapped by the shielding tube 260 to shield the magnetic field and, as shown in FIG. 7B, the inductance can be reduced by maximizing the magnetic field cancellation effect by adjusting the direction of the current.

FIG. 8 is a flowchart illustrating a power supply control method in the wireless charging power supply system 200 according to the first embodiment of the present invention.

The control of FIG. 8 is performed by the inverter 210. When the electric vehicle 10 equipped with a pick-up enters the power supply section controlled by the inverter 210, the position of the corresponding vehicle is detected (S801). The power supply section controlled by the inverter means all the capacitor units 220 connected to the corresponding inverter 210 and the power supply cable section connected thereto. The detected location of the corresponding vehicle means the power supply segment within the corresponding power supply section where the vehicle is located. The power supply segment refers to a power supply line between the inverter 210 and the next capacitor unit 221 (refer to FIG. 2), and a power supply line between the next capacitor unit 221 (refer to FIG. 2) and another next capacitor unit 222 (refer to FIG. 2), etc. Referring to FIG. 2, if the power supply line between the inverter 210 and the next capacitor unit 221 (see FIG. 2) is referred to as a first power supply segment, and the power supply line between the next capacitor unit 221 (see FIG. 2) and another next capacitor unit 222 (see FIG. 2) is referred to as a second power supply segment, the vehicle currently enters the second power supply segment.

Such position detection (S801) may be performed in various ways. As an embodiment, the method may be performed by receiving GPS information of the corresponding vehicle 10 and identifying a power supply segment within the current power supply section of the inverter 210. Alternatively, the inverter 210 connected to the power supply segment in which the vehicle 10 is located may directly detect the vehicle entry, or the capacitor units 221 and 222 connected to the power supply segment may detect the vehicle entry and send a signal to the inverter 210. Thereafter, the inverter 210 connected to the power supply segment in which the corresponding vehicle 10 is located may directly detect information on the pick-up mounted on the corresponding vehicle 10. Alternatively, the capacitor units 221 and 222 connected to the power supply segment may detect information on the pick-up mounted on the vehicle 10 and transmit the information to the inverter 210, and the inverter 210 may determine the pick-up information (S802). The pick-up information may include a type of the pick-up, a height of the pick-up from the ground, and the like.

The inverter 210 switches the power supply segment in which the vehicle is located to the charging mode according to the detected pick-up information and controls the power to be supplied (S803). Such power control, as described above with reference to FIG. 3, controls the phase of the current of each coil 240 by controlling the relay of the inverter 210 and the capacitor unit 221 or 222 of the corresponding power supply segment.

Afterwards, when the corresponding vehicle 10 leaves the power supply segment, the inverter 210 switches the corresponding power supply segment to an off mode to cut off the power of the corresponding power supply segment (S804). The power cut-off of the power supply segment may also be performed by controlling the relay of the capacitor unit 221 or 222 of the corresponding power supply segment to control the phase of the current of each coil 240.

FIG. 9 is a schematic diagram illustrating a wireless charging power supply system according to the second embodiment of the present invention when an electric vehicle is on a road, and FIGS. 10A and 10B are a schematic diagram of a power supply line switch configuration in a wireless charging power supply system according to the second embodiment of the present invention when an electric vehicle is on a road.

Hereinafter, 'power supply cable' or 'power supply coil' is used interchangeably with the same meaning.

In the power supply system as the second embodiment of FIG. 9, unlike the power supply system of the first embodiment of FIG. 2, the common line connecting the inverters 341 and 342 and the power supply unit in which the power supply coil and the power supply core are installed returns to the inverters 341 and 342. It has a structure that shares a power factor correction (PFC) 320 of the three-phase AC power source 310. That is, when the additional inverter 342 is installed, as shown in FIG. 9, the effect of reducing the dead zone between segments can be expected by sharing the PFC 320 and synchronizing it through optical cable communication.

The inverters 341 and 342 may include a switch or relay for manipulating the power supply line segment, and a capacitor for reducing withstand voltage. The withstand voltage reduction effect by the capacitor operates on the same principle as described in the power supply system 200 as the first embodiment of FIG. 2. In addition, compatibility with various vehicles and various power pick-up systems is ensured by controlling the electric power supplied to the vehicle by adjusting the current phase through the relay control of the inverters 341 and 342. This is also implemented by the same principle as described in the power supply system 200 as the first embodiment of FIG. 2.

In addition, when configuring the power supply line in FIG. 9, it can be implemented by adding segments as much as the length of the power supply section.

FIGS. 10A and 10B are a circuit diagram illustrating two embodiments of a structure for controlling each of the power supply segments 351, 352 and 353 of the power supply system 300 of FIG. 9. As a structure in which each segment can be turned on and off by operation of a switch, the number of segments and the configuration of the switch can be applied according to the control environment. Two embodiments (FIG. 10A and FIG. 10B) are shown according to the switch configurations. By selectively operating only a segment in an area requiring power supply, efficiency can be improved and unnecessary magnetic field formation can be prevented. The number of segments per inverter may change according to the environment, and accordingly, the switch configuration may also be applied and changed. The inductor portion in FIGS. 10A and 10B indicates that inductance occurs in the power supply coils of the respective power supply segments 351, 352 and 353 of FIG. 9. As described above, each capacitor performs a function of reducing the withstand voltage in each power supply line.

FIGS. 11A and 11B are a cross-sectional view illustrating a cable configuration for improving a cable withstand voltage characteristic used in a power supply line of a wireless charging power supply system according to the second embodiment of the present invention when an electric vehicle is on a road.

FIG. 11B is a configuration diagram of a new power supply line cable in which a Teflon sheath 42 is added to the outer diameter of the conductor 41 in the conventional cable used for the power supply line. As a result, it can be expected that the withstand voltage characteristics are improved and the length of the wireless charging power supply section is also increased. That is, in the cable of the conventional structure (FIG. 11A), Teflon 42, which has strong insulation properties, is wrapped around the conductor 41, and the outside is wrapped with an insulator 43 having a lower dielectric strength than Teflon (FIG. 11B). As a result, it is possible to expect the effect of extending the length of the power supply section by improving the withstand voltage characteristics compared to the existing cable.

Also in the wireless charging and feeding system 300 according to the second embodiment, the arrangement method of the common line portion of the power supply line is applied as shown in FIGS. 7A and 7B. By crossing the current directions of opposite polarities in pairs, the inductance of the line is reduced and the length of the wireless charging power supply section can be expected to increase.

Each of FIGS. 12A to 12E is a diagram illustrating types of dead zone and improvement plans for the dead zone in a power supply line of a wireless charging power supply system according to the second embodiment of the present invention when an electric vehicle is on a road.

Each of FIGS. 12A to 12E shows the types of dead zones that may occur in the power supply line and methods for improving them. By adding a ferromagnetic material between each segment, the induced voltage decrease is prevented and a certain amount of output is maintained during wireless charging. Here, the 'dead zone' means a section in which charging power is not properly transmitted because the induced voltage delivered to the vehicle's power pick-up system is reduced.

FIGS. 12A, 12B, and 12D show an example of a dead zone that may occur between each segment, respectively.

In the case of FIG. 12A, the improvement method has already been applied, and the induced voltage reduction phenomenon is prevented by arranging the power supply line cables to be at right angles as much as possible.

The case of FIG. 12B can be improved by adding a power supply core, that is, a ferromagnetic material 50, between the power supply segments as shown in FIG. 12C. In addition, the dead zone can be minimized by placing each power supply segment close to each other or installing the distance between each segment as close as possible.

The case of FIG. 12D can also be improved by adding a feeding core, that is, a ferromagnetic material 50, between the power supply segments, as shown in FIG. 12E. In addition, by installing the distance between each segment as close as possible, the dead zone can be minimized.

FIG. 13 is a view showing a shielding treatment for a portion of an input power line to an inverter and a common line of a power supply line in a wireless charging power supply system according to the second embodiment of the present invention when an electric vehicle is on a road.

The input power line 60 and the common line 70 are shielded 62, 72 with shielding pipes 61, 71, respectively, and the shielding pipes 61, 71 are connected to the inverter side and then grounded 90. This is a grounding method to prevent electromotive force that may occur in the shielding tube for suppressing unnecessary electromagnetic fields. The input power line 60 may be shielded with a shielding tube or may be shielded with a covering material, which is commonly represented as being shielded with a shielding tube 61. Such a shielding tube may also be applied to the wireless charging and feeding system 200 according to the first embodiment.

FIG. 14 is a view showing an embodiment of a jig for the construction of a power supply core in a wireless charging power supply system according to the second embodiment of the present invention when an electric vehicle is on a road.

The prefabricated jig 80 is provided with a power supply core 370, that is, a fixing frame capable of fixing a plurality of ferromagnetic materials and a support for holding a power supply line cable (power supply coil 360). It is possible to install a plurality of ferromagnetic materials 370 at once, thereby effectively disposing the power supply line cables 360. Such a jig 80 may have various shapes according to the shape of the power supply line. Such a jig 80 may also be applied to the construction of the wireless charging power supply system 200 according to the first embodiment.

Meanwhile, a flowchart illustrating a power supply control method in the wireless charging power supply system 200 according to the first embodiment described in FIG. 8 may also be applied to the wireless charging power supply system 300 according to the second embodiment. That is, in the wireless charging power supply system 300 according to the second embodiment, each inverter 341 and 342 includes a relay that can be controlled. When controlling the power of the power supply segment in step S803, according to the current collector information identified as described above (S802), each of the inverters 341 and 342 controls the relay of the corresponding power supply segment. Power delivered to the pick-up system 400 may be controlled by a method of controlling the phase of the current of each power supply coil. Similarly, the power cutoff of the power supply segment can also be performed by controlling the relay of the corresponding power supply segment to control the phase of the current of each power supply coil.

In addition, the graph of FIG. 6 showing the change in inductance per unit distance of the power supply line according to the illustrated design variable may be equally used for setting the design variable value of the wireless charging power supply system 200 according to the second embodiment in the same manner as described in FIG. 6.

FIG. 15 is a view showing an embodiment of a cable configuration in the wireless charging pick-up system of the present invention.

The wireless charging pick-up system 400, that is, a pick-up device is installed under the vehicle and receives wireless power from the wireless charging power supply systems 200 and 300 of the present invention while driving.

Hereinafter, 'pick-up cable' or 'pick-up coil' is used interchangeably with the same meaning. FIG. 15 shows a parallel coil structure in the wireless charging pick-up system 400 implemented with a relatively low inductance. That is, it may be physically a three-coil two-parallel structure or a plurality of coils 410 parallelized more than two. A low inductance effect can be expected by electrically connecting each coil in series and physically paralleling them.

FIG. 16 is a view showing another embodiment of the cable configuration in the wireless charging pick-up system of the present invention. And FIG. 17 is a view showing the arrangement of a capacitor for withstand voltage branching in the wireless charging pick-up system of the present invention.

In FIG. 16, the overall arrangement of the pick-up coils 420 arranged in series and the capacitor 450 for withstand voltage branching for the reduction of the withstand voltage with respect to the pick-up coil 420 is shown. FIGS. 17A to 17C show a more detailed configuration diagram of the capacitor 450 for such a withstand voltage branching.

Depending on the installation environment of the pick-up system 400, the position of the withstand voltage branch may be vertically or horizontally symmetrical, and may be biased toward one side. That is, the installation position of the capacitor 450 for withstand voltage branching may be changed flexibly.

Referring to FIGS. 17A and 17B, by arranging adjacent pick-up coils to have opposite current directions according to the direction of the current excited in the capacitor 450, the unnecessary magnetic field is reduced by canceling the magnetic field. Accordingly, the effect of minimizing the temperature rise due to induction heating between the capacitors 450 groups can be expected. In addition, in the case of a layered capacitor group (capacitor box 460, see FIG. 19), the direction of the current is arranged to form a pair of + and − (that is, magnetic fields generated by the current flowing through the capacitor are cancelled each other) as shown in FIG. 17C. In this way, it is possible to minimize the increase in the induction heating temperature of the capacitor and the aluminum/iron box, which is the capacitor box, or the vehicle. That is, as indicated by alternating red and blue in the left and right boxes of FIG. 17C, the current direction of each capacitor may be arranged such that the incoming and outgoing current directions are paired.

FIG. 18 is a diagram illustrating a structure of a ferromagnetic material and a magnetic field dense saturation distribution thereof in the wireless charging pick-up system of the present invention.

Upper left part of FIG. 18 shows a magnetic field distribution diagram showing a state in which the saturation phenomenon of the core occurs due to relatively dense magnetic fields in the coil of the same current direction when the pick-up core 430 of the conventional shape of FIG. 18 is applied.

By applying the pick-up core 440 of the shape shown in FIG. 18 to the wireless charging pick-up system 400 of the present invention, the magnetic field density is reduced by reducing the magnetoresistance component, thereby reducing heat generation in the system 400, and the result is shown in lower left part of FIG. 18.

FIG. 19 is a view showing the installation position of the capacitor box in the wireless charging pick-up system of the present invention.

Left part of FIG. 19 is a view of the pick-up system 400 viewed from the side, and right part of FIG. 19 is a view looking up at the pick-up system 400 from the underside of the vehicle. The capacitor box 460 includes a capacitor 450 for withstand voltage branching shown in FIGS. 16 and 17. It can be expected that the pick-up system 400 and the capacitor box 460 for withstand voltage branching are configured separately to be advantageous for maintenance. Due to the location characteristics of the pick-up coil 420 installed under the vehicle, when the capacitor for withstand voltage branching is integrally configured with the pick-up system 400, there is a difficulty in maintenance. In order to advantageously maintain the capacitor 450 having a relatively high probability of damage, the capacitor box 460 is separated and installed at a location where maintenance is easy.

FIGS. 20A and 20B are views showing a simulation result for the prediction of induction heating around the pick-up system in the wireless charging pick-up system of the present invention, and a state of installing a magnetic field shield to prevent the same.

A portion indicated by a dotted line in FIG. 20A is a portion where heat is expected due to the influence of a magnetic field. That is, FIG. 20A is a view showing simulation results for an induction heating state due to the influence of a supplying electric field around the pick-up system 400 in a state where the pick-up system 400 is looked up from the underside of the vehicle. FIG. 20B shows the installation state of the magnetic shield plate 470 for preventing such induction heating.

When the bottom part of the vehicle made of iron is inductively heated due to the influence of the power supply, a significant amount of power loss is caused and it is a factor reducing the efficiency of the entire wireless charging pick-up system 400. As a way to prevent this, a magnetic field shielding plate 470 is installed around the pick-up system 400 as shown in FIG. 20B. By installing the magnetic shielding plate 470, the effect of the supplied magnetic field on the bottom part of the vehicle is reduced, and induction heating is prevented, thereby reducing heat consumption.

FIGS. 21A and 21B are views showing an embodiment of the installation form of the sensor for detecting the heat of the ferromagnetic material in the wireless charging pick-up system of the present invention.

In FIG. 21A, a magnetic field shielding plate 480 is provided on the pick-up core, i.e., the ferromagnetic material 440 at a predetermined interval from the ferromagnetic material 440. A sensor for detecting heat generated by the pick-up system 400, that is, an over-temperature (OT) sensor 491 is installed on a lower surface of the magnetic shielding plate 480.

The magnetic shielding plate 480 may be an aluminum plate as an embodiment. A signal line 492 for transmitting the temperature signal detected by the OT sensor 491 to the control unit is connected to the OT sensor 491. The OT sensor 491 is installed in a portion having the highest possibility of ferromagnetic saturation and heat generation according to the pick-up coil structure, and provides temperature information of the pick-up system 400 to the control unit.

FIG. 21B is an enlarged view of the OT sensor 491 and the signal line 492.

As described above, although the present invention has been described with reference to limited embodiments and drawings, the present invention is not limited thereto, and the technical idea of the present invention and claims by those of ordinary skill in the art to which the present invention pertains. Various modifications and variations are possible within the scope of equivalents of the claims to be described.

What is claimed is:

1. A system for controlling the wireless charging power of electric vehicles and industrial equipment (hereinafter, collectively referred to as 'electric vehicles') in operation equipped with a pick-up, comprising:
a power supply segment including a power supply cable through which an alternating current flows and a power supply core composed of a ferromagnetic material for effectively transferring the power generated from the power supply cable to the pick-up system; an inverter having a wired connection to each of a plurality of the power supply segments and controlling the supply of AC current flowing through the power supply cables of the respective power supply segments; and a capacitor connected within the power supply cable and configured to cancel an inductance generated in the power supply cable, thereby reducing a withstand voltage requirement, wherein two or more inverters adjacent to each other share a power factor correction of 3-phase AC power.

2. The system according to claim 1, wherein the coil constituting the power supply cable has a structure in which an insulating layer is wrapped around a conductor and the outside of the insulating layer is wrapped with an insulator with a lower withstand insulator characteristics than the insulating layer.

3. The system according to claim 1, wherein, at a section between each power supply segment, the power supply cable is at right angles in order to prevent dead zones.

4. The system according to claim 1, wherein a ferromagnetic power supply core is additionally installed between each of the power supply segment in order to prevent dead zones.

5. The system according to claim 1, wherein, at a section between each power supply segment, each power supply segment is placed to contact with or close to other ones in order to prevent dead zones.

6. The system according to claim 1, wherein a relay is further provided in each of the power supply segment, wherein, when the power supply cable consists of n (n is an integer greater than or equal to two (2)) pairs of coils, each coil can independently adjust the phase of the current by the relay so that any combination of 0 degree or 180 degree phase is possible for the n-pair coils, wherein wireless power supplied through the power supply cable is controlled by the current phase combination.

7. The system according to claim 1, wherein, in a section in which each coil constituting the power supply cable is gathered, the current direction of each coil is set to cancel the magnetic field by more than a predetermined threshold.

8. The system according to claim 1, further comprising a shielding tube that is installed in a section where each coil constituting the power supply cable is collected and that surrounds the entire coil to shield the magnetic field.

9. The system according to claim 6, wherein, when the electric vehicle enters a power supply section controlled by the inverter, the inverter detects the position of the electric vehicle and information on the pick-up mounted on the electric vehicle, and outputs power at the point where the electric vehicle is located according to the detected pick-up information; and wherein, when the electric vehicle leaves the power supply section controlled by the inverter, the inverter cuts off power.

10. A method of controlling power supply of the wireless charging power supply system of claim 1, comprising the steps of:
(a) detecting, by the inverter, a position of the electric vehicle equipped with a pick-up when the electric vehicle enters a power supply section controlled by the inverter;
(b) determining, by the inverter, information on the pick-up mounted on the electric vehicle;
(c) switching, by the inverter, the power supply segment at the position where the electric vehicle is located to a charging mode according to the determined pick-up information, and controlling the power to be supplied to the power supply segment; and,
(d) switching, by the inverter, when the electric vehicle leaves the position, the power supply segment at the position to off mode to cut off the power.

11. The method according to claim 10, wherein, when the power supply cable consists of n (n≥2) pairs of coils, each coil can independently adjust the phase of the current by means of a relay such that any combination of 0 degree or 180 degree phase is possible for the n pairs of coils, and wherein the inverter controls the wireless power supplied through the power supply cable by the control of the current phase combination.

12. A pick-up system installed under the electric vehicle and wirelessly collecting power from the wireless charging power supply system of claim 1, comprising:
a pick-up cable for generating an induced voltage in cooperation with the wireless charging power supply system;
a pick-up core composed of a ferromagnetic material for effectively generating an induced voltage in the pick-up cable; and,
capacitor for withstand voltage branching to reduce withstand voltage for the pick-up cable,
wherein the pick-up core has a shape that reduces magnetic field density, thereby reducing the possibility of heat generation, and
wherein the pick-up cable is arranged so that the current directions of adjacent pick-up cables are opposite to each other according to the current direction in the capacitor for withstand voltage branching, and the current direction of each capacitor is arranged such that the incoming and outgoing current directions are paired.

13. The pick-up system according to claim 12, further comprising a capacitor box containing a plurality of the capacitors for withstand voltage branching and installed separately from the pick-up core and the pick-up cable to facilitate maintenance.

14. The pick-up system according to claim 12, further comprising a magnetic field shielding plate disposed around the pick-up core and the pick-up cable in order to prevent heat generation in iron frame of the electric vehicle caused by the magnetic field influence of the power supply cable and magnetic field of the pick-up system.

15. The pick-up system according to claim 12, further comprising a magnetic field shielding plate disposed on the pick-up core and spaced apart from the power supply core; and a sensor disposed on a lower surface of the magnetic shield plate and configured to detect heat generated by the pick-up system.

* * * * *